US011354299B2

(12) United States Patent
Zhu et al.

(10) Patent No.: US 11,354,299 B2
(45) Date of Patent: Jun. 7, 2022

(54) METHOD AND SYSTEM FOR A HIGH AVAILABILITY IP MONITORED BY BOTH OS/NETWORK AND DATABASE INSTANCES

(71) Applicant: ORACLE INTERNATIONAL CORPORATION, Redwood Shores, CA (US)

(72) Inventors: Ming Zhu, Redwood City, CA (US); Cheng-Lu Hsu, Sunnyvale, CA (US)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 358 days.

(21) Appl. No.: 16/165,997

(22) Filed: Oct. 19, 2018

(65) Prior Publication Data
US 2020/0125662 A1    Apr. 23, 2020

(51) Int. Cl.
*G06F 16/23* (2019.01)
*G06F 16/27* (2019.01)
*H04L 41/0816* (2022.01)
*G06F 9/54* (2006.01)
*H04L 67/10* (2022.01)
*H04L 43/0805* (2022.01)

(52) U.S. Cl.
CPC .......... *G06F 16/2379* (2019.01); *G06F 9/542* (2013.01); *G06F 16/27* (2019.01); *H04L 41/0816* (2013.01); *H04L 43/0805* (2013.01); *H04L 67/10* (2013.01)

(58) Field of Classification Search
CPC ...... G06F 16/2379; G06F 16/27; G06F 9/542; H04L 41/0816; H04L 43/0805; H04L 67/10
See application file for complete search history.

(56) References Cited

U.S. PATENT DOCUMENTS

| | | | | |
|---|---|---|---|---|
| 7,900,085 B2* | 3/2011 | Little | ............. | G06F 11/203 714/10 |
| 8,055,735 B2* | 11/2011 | Krishnappa | ............. | G06F 15/16 709/220 |
| 8,549,364 B2* | 10/2013 | Ziskind | ............. | G06F 11/0757 714/48 |
| 8,621,263 B2* | 12/2013 | Bae | ............. | G06F 11/181 714/4.21 |
| 9,231,838 B2* | 1/2016 | Ould-Brahim | ...... | H04L 43/0811 |
| 9,400,829 B2* | 7/2016 | Shadmon | ............. | G06F 16/2343 |
| 2003/0035408 A1* | 2/2003 | Hebert | ............. | H04L 41/0663 370/349 |
| 2008/0077635 A1* | 3/2008 | Sporny | ............. | G06F 16/1834 |

(Continued)

OTHER PUBLICATIONS

Oracle Corp., "Linux OCFS2 Best Practices Guide", Feb. 2014, Oracle White Paper, pp. 1-27.

(Continued)

*Primary Examiner* — Miranda Le
(74) *Attorney, Agent, or Firm* — Vista IP Law Group, LLP

(57) ABSTRACT

Described is a system, method, and computer program product to handle unresponsive node communications between two nodes of a database cluster. A high availability monitoring module is provided to address unresponsive node communications before having to automatically evict nodes from the cluster simply for exceeding a communications timeout period threshold.

17 Claims, 27 Drawing Sheets

(56) References Cited

U.S. PATENT DOCUMENTS

| | | | | |
|---|---|---|---|---|
| 2008/0155560 | A1* | 6/2008 | Iwamoto | H04L 41/5009 719/318 |
| 2011/0145627 | A1* | 6/2011 | Huras | G06F 9/526 714/3 |
| 2012/0197822 | A1* | 8/2012 | Lee | H04L 67/16 706/10 |
| 2016/0210205 | A1* | 7/2016 | Mcalister | G06F 11/1451 |
| 2017/0318092 | A1* | 11/2017 | Maredia | H04L 47/70 |

OTHER PUBLICATIONS

Bosilca, George et al. "Failure Detection and Propagation in HPC systems", SC 2016—The International Conference for High Performance Computing, Networking, Storage and Analysis, Nov. 2016, Salt Lake City, US, pp. 1-12.

Hayashibara, Naohiro et al. "The φ Accrual Failure Detector", May 10, 2004, School of Information Science, pp. 1-16.

Phan-Ba, Michael Duy-Nam, "A Literature of Failure Detection Within the Context of Solving the Problem of Distributed Consensus", Apr. 2015, The University Of British Colombia, Vancouver, pp. 1-47.

Willsky, Alan S. "A Survey of Design Methods for Failure Detection in Dynamic Systems", 1976, Automatica, vol. 12, Pergamon Press, pp. 601-211.

Xiong, Naixue, et al. "A Self-tuning Failure Detection Scheme for Cloud Computing Service", 2012, IEEE $26^{th}$ International Parallel and Distributed Processing Symposium, pp. 668-679.

Shokri, Eltefaat, et al. "An Approach for Adaptive Fault-Tolerance in Object-Oriented Open Distributed Systems", Feb. 1997, Workshop on Object-Oriented Reliable Distributed Systems, Newport Beach, CA, pp. 1-8.

Oracle Corp., "Oracle Real Application Clusters on Oracle WM Environments", Jan. 2017, Oracle White Paper, pp. 1-45.

Oracle Corp., "Understanding Oracle RAC Internals", Sep. 23, 2013, pp. 1-50.

Oracle Corp., "Oracle Database High Availability Best Practices", Aug. 2011, 11g Release 2, pp. 1-262.

Oracle Corp., "Oracle Clusterware Administration and Deployment Guide", Jul. 2017, Oracle Clusterware, 12c Release 1, pp. 1-662.

Womack, Jim, et al. "Clusterware Administration", Sep. 2014, Oracle Database Student Guide, 12c, pp. 1-406.

Notice of Allowance dated Aug. 26, 2020 for related U.S. Appl. No. 16/165,314.

* cited by examiner

METHOD AND SYSTEM FOR A HIGH AVAILABILITY IP MONITORED BY BOTH OS/NETWORK AND DATABASE INSTANCES

CROSS REFERENCE TO RELATED APPLICATIONS

The present application is related to U.S. application Ser. No. 16/165,314, filed on even date herewith, entitled "METHOD AND SYSTEM FOR A SPEED-UP CLUSTER RECONFIGURATION TIME VIA A GENERIC FAST SELF NODE DEATH DETECTION" which is hereby incorporated by reference in its entirety.

FIELD

This disclosure concerns a method, a computer program product, and a computer system for maintaining high availability for database instances.

BACKGROUND

A database clustering system allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via multiple database instances. In this way, the separate servers (e.g., nodes) appear as if they are one system to applications and end users.

In order for the database cluster to operate properly, these servers (e.g., nodes) will need to be able to communicate with one another in order to perform work. The issue that arises is that sometimes, when node 1 needs to communicate with node 2, node 1 may not receive a response back. This is problematic because node 1 cannot continue to perform work unless it receives an acknowledgement from node 2. A conventional approach predefines a timeout period threshold. If heartbeats or messages sent to other nodes of the database cluster are not acknowledged within the timeout period threshold, the system would automatically begin an eviction. An eviction in the context of a clustered database system is the process of removing a failed (due to various reasons) database instance/node from the cluster.

The conventional approach is problematic because it is a one size fits all solution that essentially evicts the database instance/node from the cluster. The problem is that regardless of whether the real underlying problem is very serious or not, the conventional draconian remediation process, nonetheless, performs the eviction. As a result, the eviction process is a very expensive proposition because all of the processes taking place on the database instance/node must be paused, migrated and rebuilt on another node to continue processing.

Because this one size fits all model cannot handle any discrepancies or any changes of the underlying problem or any severity of the problem, this draconian measure is only sometimes appropriate. This leads to excess consumption of network data because data must be migrated from the first node and rebuilt at the second node. Furthermore, excess consumption of computer processing is also required to migrate and rebuild the processes and data from the first node to a second node, which causes the computer system itself to not operate as efficiently.

Therefore, what is needed is an improvement approach to implement a detection and resolution of problems in a clustered database.

SUMMARY

According to some embodiments, a system, method, and computer program product is provided to handle unresponsive node communications between two nodes of a database cluster. A high availability monitoring module is provided to address the unresponsive node communications before having to automatically evict the node from the cluster simply for exceeding a communications timeout period threshold.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope. The drawings use like reference numerals to identify like elements. A letter after a reference numeral, such as "120*a*," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120*a*" and/or "120*b*" in the drawings). The invention will be described and explained with additional specificity and detail through the use of the accompanying drawings in which.

DETAILED DESCRIPTION

Figure 1:
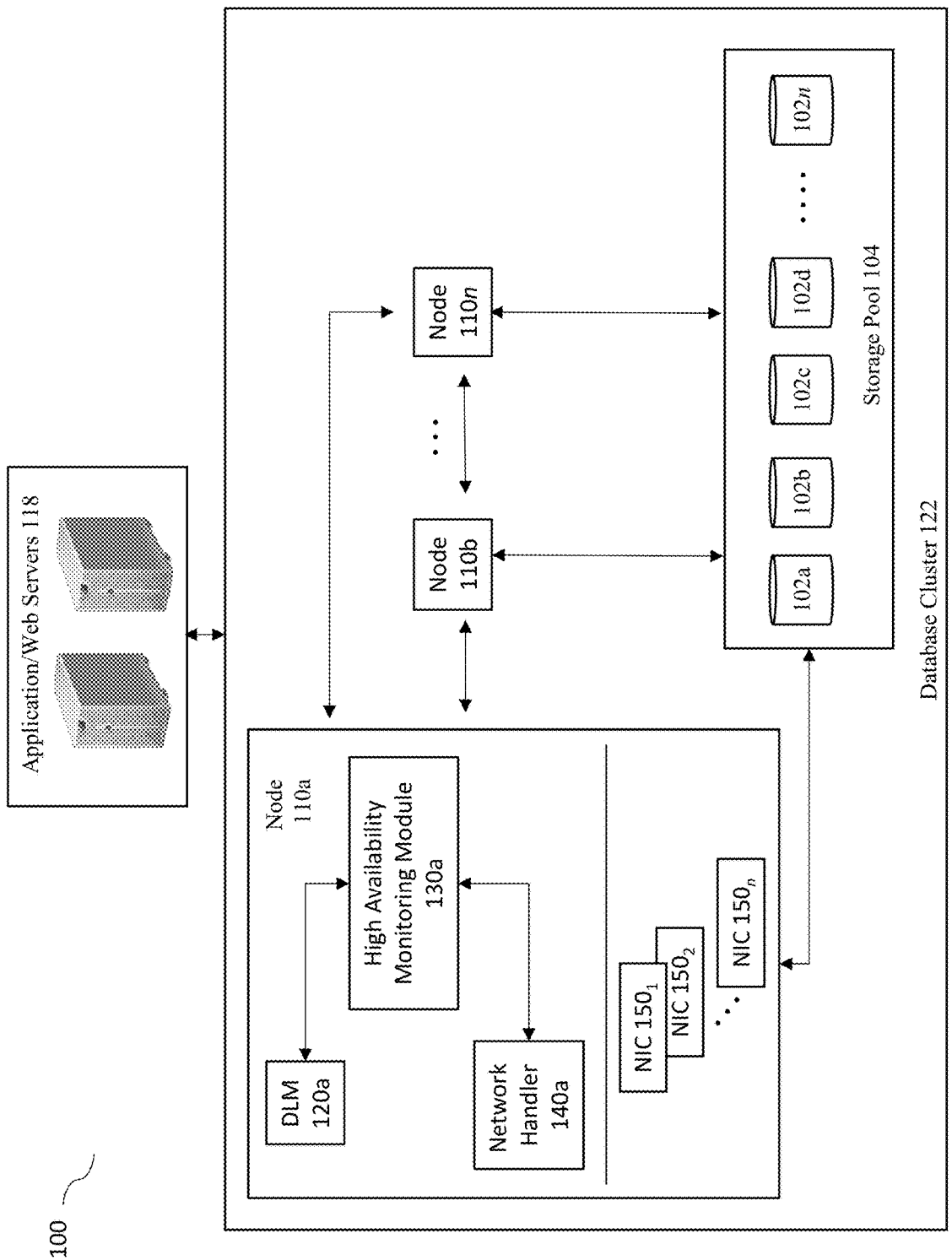
FIG. 1 illustrates an architecture for maintaining high availability database systems, according to some embodiments of the present disclosure.

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The present disclosure does not provide a one size fits all model that just merely evicts a database instance without first trying to determine if alternative preventative actions may prevent an automatic eviction of the database instance. Instead, the way the improved systems and methods operate is to take preventative actions well before exceeding the timeout period threshold for evicting a node from the database cluster. Nodes in the database cluster must communicate with one another for a variety of reasons. Retrieving of database locks and releasing of database locks are a few examples of why nodes need to communicate to one another in order to perform work is the.

The system and methods of the present disclosure leverage the communication that a distributed lock manager (DLM) has between the nodes (e.g., between a first node and a second node, a second node and a third node, etc.) of the database cluster. A DLM runs in every machine in a database cluster, with an identical copy of a cluster-wide lock database. In this way a DLM provides software applications which are distributed across a database cluster on multiple machines with a means to synchronize their accesses to shared resources. Being able to detect issues at the communication level, the system and methods of the present disclosure may take progressively more aggressive actions if necessary such that an eviction of the node is the last possible measure to take, as opposed to the default measure to take once a timeout period threshold has been exceeded.

In order to detect issues at the communication level, the system and methods of the present disclosure integrate the processing of the DLM (e.g., processing for locks between the nodes) with a network handler that checks and manages the status of network components of the system. By way of this integration, the system and methods of the present disclosure can determine the severity level of the problem to determine whether or not the problem is a problem that may be able to clear itself; whether the problem is not severe enough to perform an eviction; or whether the problem is actually severe enough to warrant an eviction.

An eviction is sometimes necessary to avoid "Split-Brain" issues. Split-brain is a computer term based on an analogy with the medical Split-brain syndrome. Split-brain indicates data inconsistencies originating from the maintenance of two separate data sets with overlap in scope because of a failure condition based on servers not communicating and synchronizing their data with each other.

To avoid the Split-brain phenomenon, the culprit nodes and/or instances are evicted. Causes of node eviction may include: missing network heartbeat, missing disk heartbeat, CPU starvation issues, and hanging cluster processes (e.g., DLM processing). Evicting a node from the database cluster incurs a large computer computation cost of the computing system since the existing processes on the node being evicted must be paused, migrated to another node and restarted on the other node. Furthermore, data associated with the processes must also be migrated to the other node. Therefore, although node eviction is sometimes required to avoid the Split-brain phenomenon, node eviction should be considered as a last option after prior remediation processing have failed.

The approach disclosed herein improves the technological area of high availability database instances by preventing unnecessary database instance evictions from the database cluster. The approach also improves the performance of the computing system itself by reducing the amount of computer system processing and network data traffic involved in automatically performing an eviction process merely because of a communication issue exceeding an arbitrarily pre-configured timeout period threshold. Instead, the approach integrates, for example, the DLM processing with a network component interface layer to detect issues, identify possible corrective measures, and act based on the possible corrective measures to avoid unnecessary eviction processing of the node—especially if a simple corrective action can be implemented at the network communication layer to avoid an eviction.

Note, for purposes of illustration, the present disclosure is discussed using a DLM application as a client/user of a cluster manager that integrates the DLM application with the network handler. It is to be noted that this disclosure is not limited to this particular context of a DLM application. Any other user/application may integrate with the cluster manager to take advantage of the present disclosure to provide preventative/remedial actions before having to take draconian types of actions to resolve cluster management issues. A user/application of the cluster manager may be any distributed application where the DLM is just one example of a distributed application integrating with the cluster manager.

FIG. 1 illustrates an architecture for maintaining high availability database systems, according to some embodiments of the present disclosure. System 100 illustrates an architecture for maintaining database cluster systems by monitoring database communications between multiple nodes at an OS/network and database instances level. Monitoring the database communications at the OS/network and database instances level is attainable via a high availability monitoring module that integrates processing from a DLM and a network handler.

A database cluster 122 is provided to handle workloads from one or more clients seeking to access a database through one or more application/web servers 118. The database cluster includes a database that is stored within multiple storage devices 102*a-n* within a storage pool 104. The database stored within the storage pool 104 may have one or more tables that are operated upon by the one or more clients, where the clients operate one or more user stations to issue SQL commands to be processed by the database. The user stations and/or the servers within the system 100 comprise any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs.

The database cluster 122 includes multiple interconnected computers or servers that appear as if they are one server to the end users and applications that seek to access the database through the servers 118. A server that is part of a cluster, otherwise known as a node or a cluster member, requires a second network. This second network is referred to as an interconnect. For this reason, cluster member nodes require at least two network interface cards (NICs): one for a public network and one for a private network. The interconnect network is a private network using a switch (or multiple switches) that only the nodes in the cluster can access. A NIC is a circuit board or card that is installed in a computer so that the computer can be connected to a network.

The database cluster 122 includes a plurality of nodes 110 (e.g., node 110*a*, node 110*b*, . . . node 110*n*), and a storage pool 104. Each node 110 may include a single database instance or a plurality of database instances. Each node 110, in the database cluster 122, needs to communicate with one another (e.g., via the NICs) in order to properly handle, as an example, the DLM process. The DLM process permits multiple database instances (e.g., nodes) to access the same database files simultaneously, where communications between the database instances are managed by the DLM. To address the possibility of two or more instances attempting to modify the same information simultaneously, the DLM uses multiple distributed processes to lock the resources in use by these instances. For purposes of illustration only, the following description will refer to the use of a distributed lock manager (DLM) 120*a*, but it is noted that the invention is not limited to a DLM, and indeed, may be usefully applied to a system having any type of database processing schemes that may require communication and coordination between multiple database instances and/or nodes.

Node 110*a* may include a DLM 120*a*, a high availability monitoring module 130*a*, a network handler 140*a*, and one or more NICs 150. The DLM 120*a* uses multiple distributed processes to lock resources in use by the database instances and/or nodes. In order for the DLM 120*a* to work properly, the DLM 120*a* must be able to consistently communicate with other database instances/nodes.

The high availability monitoring module 130*a* is an event manager that receives events (e.g., electronic communications), from modules such as the DLM 120*a* when an error may have been detected by the DLM 120*a*. If an error is detected by the DLM 120*a*, the DLM 120*a* may send an event with a particular event type to the high availability monitoring module 130*a* for inspection and/or resolution. The high availability monitoring module 130*a* integrates an early issue detection functionality of the DLM with the OS/network level of monitoring of a network handler 140*a* to provide the ability to resolve certain types of communication issues between the nodes of the database cluster to avoid the one size fits all remediation method of the legacy approach.

Based on an event type of an event received from the DLM 120*a*, the high availability monitoring module 130*a* may instruct the network handler 140*a* to research and resolve, as an example, a network communication error identified by the DLM by checking statuses of the NICs 150.

A NIC 150, as discussed above, is a circuit board or card that is installed in a computer so that the computer can be connected to a network. A NIC 150 provides the computer with a dedicated, full-time connection to a network. Communications between the nodes of the database cluster 122 are transmitted via the NICs 150 on each respective node via a private network. A node 110 may include a plurality of NICs 150 such that a first set of the NICs 150 may be dedicated to the database communications and a second set of NICs 150 may be dedicated to other processes running on node 110 (e.g., public network for applications to interact with, as an example, the Internet).

When the DLM 120*a* suspects a potential error may have occurred, the DLM 120*a* may send an event to the High Availability Monitoring Module 130*a* to request assistance in possibly detecting and curing the potential error before the node is evicted from the database cluster 122. For example, a DLM 120*a* issues a lock request to another node (e.g., node 110*b*). However, the DLM 120*a* on node 110*a* does not receive any acknowledgement from the other node (e.g., node 110*b*) for some time. Typically, based upon legacy approaches, any failed processing of the DLM over a predefined timeout period threshold results in an automatic eviction of the node from the database cluster, regardless of the problem or the severity of the problem.

However, the present disclosure provides a mechanism for taking preventative actions before the timeout period threshold is exceeded (e.g., after 50% or some predefined % of the timeout period threshold has already elapsed), hereinafter referred to as an "early detection time." The early detection time provides an opportunity to determine if alternative solutions, other than eviction, may be possible. One such alternative solution may simply be to inspect the status of the NICs 150 dedicated to the database instance that provides the private network between node 110*a* and the other node(s) (e.g., node 110*b* . . . node 110*n* in this example). If it is determined that a current NIC on node 110*a* is bad (e.g., NIC 150$_1$ is bad) but another NIC (e.g., NIC 150$_2$) is good, the network handler 140*a* may simply implement a failover such that traffic originally flowing through NIC 150$_1$ may flow through NIC 150$_2$ as a result of the failover. In many situations, this simple failing over from one bad NIC to another good NIC may prevent the node from being evicted from the database cluster 122.

As another example, the network handler 140*a* may instruct each NIC 150 to provide a status and some information of its current operating conditions. Based on the statuses and information received from the NICs 150, and instructions corresponding to rules associated with an event type of the event, the network handler 140*a* may be instructed to perform a failover from NIC 150$_1$ to NIC 150$_2$ even though NIC 150$_1$ may have reported that NIC 150$_1$ is operating fine (i.e., not having any issues). The rule may instruct the network handler 140a to perform the failover to another good NIC (e.g., NIC 150₂) to determine if the failover to the other good NIC resolves the issue. This logic is based on the idea that just because NIC 150₁ reports it may be operating fine, something else may be causing an error since the DLM process going through NIC 150₁ is still experiencing issues. If failing over to NIC 150₂ resolves the issue, then the failover is considered a successful avoidance of a potential eviction process. This is because the issue may be that NIC 150₁ was experiencing, as an example, a temporary bandwidth saturation and/or network congestion issue at a particular point in time. The DLM may have detected the issue since it was waiting for the acknowledgement and the early detection time had expired. Although NIC 150₁ may have reported that it was operatively fine, the DLM was able to detect the issue and generated an event to further investigate and possibly resolve before the entire node/database instance is evicted, merely because of some network traffic issues.

After waiting a configurable failback time period (e.g., failback threshold), the high availability monitoring module 130a may instruct the network handler 140a to failback from NIC 150₂ back to NIC 150₁ to see if NIC 150₁ is functioning properly again. However, if the high availability monitoring module 130a receives another event associated with communication issues with NIC 150₁ after the failback, then a failover to NIC 150₂ may be initiated again to resolve the impending issue. The high availability monitoring module 130a may failback to NIC 150₁ again after the configurable failback time period. The failback process may repeat itself for a configurable amount of times (e.g., 3 times) before the high availability monitoring module 130a raises an error message pertaining to NIC 150₁ to either replace the actual NIC 150₁ from node 110a, or to redistribute processing loads coming through NIC 150₁ to other NIC(s) configured on node 110a if it is determined that NIC 150₁ may be, as an example, over saturated with database events.

Figure 2:
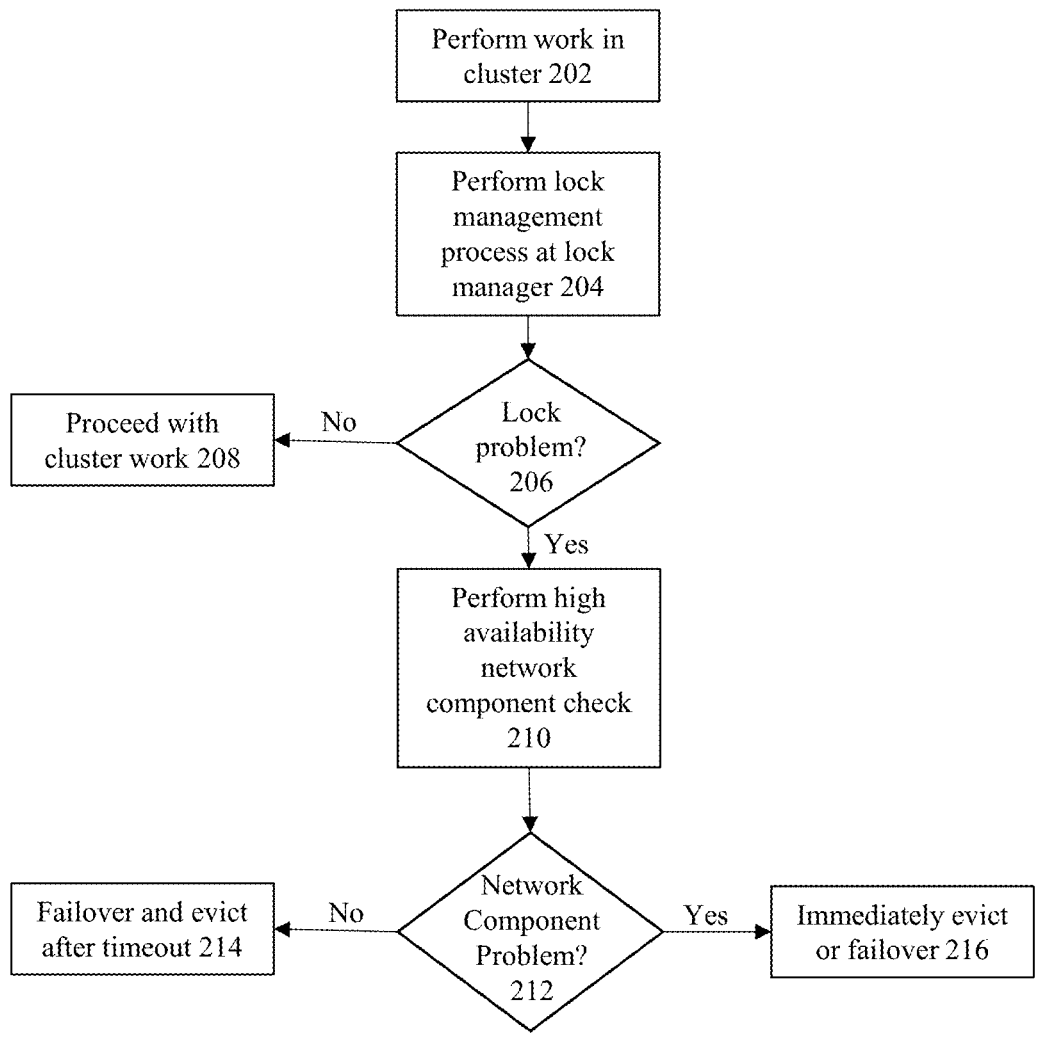
FIG. 2 illustrates a high-level flowchart of an approach to implement some embodiments of the present disclosure.

FIG. 2 illustrates a high-level flowchart of an approach to implement some embodiments of the present disclosure. FIG. 2 is discussed with references to elements of FIG. 1. At 202, work in the database cluster is performed. The work may be an execution of a database transaction performed on data stored on storage devices within the storage pool or on the structure of database objects within the database itself. The work may include, as an example, a database write transaction requested by an application/web server 118.

As a result of the write transaction, at 204, the lock manager initiates a lock management process. The lock manager 120a coordinates lock requests, ensuring compatibility of access rights to the resources. In this process, the DLM tracks all lock requests. Requests for available resources are granted and the access rights are granted and tracked. The DLM keeps an inventory of all lock requests and communicates their status to the users and processes involved. Before work may resume on the write transaction, the lock manager 120a must receive acknowledgement from the other node(s) within the database cluster 122 to ensure the locks for the relevant database record(s) are granted by other member nodes of the database cluster so that node 110a may proceed to perform the database write transaction using the granted locks.

At step 206, a determination is made as to whether or not there is a lock problem. For example, if the lock request sent to the other node(s) received an acknowledgement from the other node(s) before the early detection time, then there are no lock problems detected at step 206. Thus, processing continues to proceed with the work of executing the database update transaction at step 208.

However, a lock problem may be identified if the early detection time has been exceeded (e.g., after 50% of the timeout period threshold) before the DLM 120a receives an acknowledgement from the other node(s) for the lock request sent. At this point, the DLM 120a may generate and send an event with a particular event type (e.g., DLM acknowledgement not received) to the high availability monitoring module 130a to inspect and/or resolve the lock problem. Note: although 50% of the timeout period threshold is used as an example of the early detection time, one skilled in the art may appreciate that the 50% discussed in the example(s) may be a configurable field that may be set as any percentile or at any particular amount time or as a result of a computation based on rules or machine learning algorithms.

At 210, based at least in part on the event type, the high availability monitoring module 130a may identify certain rules for handling the particular event type. One rule may include performing a network component check to determine if there are any network component (e.g., NIC) problems.

At 212, the high availability monitoring module 130a may determine that there are no network component problems (e.g., all NICs are performing properly). The high availability monitoring module 130a may determine that there is nothing further to do to fix the problem since all NICs are performing properly so the issue may be something else (e.g., not network related). Thus, at 214, the event is sent back to the DLM such that through the normal delay process (e.g., exceed the timeout period threshold) the node is evicted from the database cluster. However, in some embodiments, the high availability monitoring module 130a may implement a failover from a first NIC (e.g., the NIC assigned to communicate the lock event that is allegedly reporting that it is performing properly) to a second NIC on the node just in case the first NIC is temporarily experiencing network congestion or bandwidth saturation.

At 212, the high availability monitoring module 130a may determine that there may be one or more network components (e.g., NICs) experiencing problems. At 216, an immediate eviction may be warranted if it is determined there are no workable network components (e.g., all NICs for database processing on the node are reporting a status of inoperability), or failover to a working network component to possibly resolve the pending network component issues.

It is noted that different timeout period thresholds can be selected to further the specific results sought to be achieved to address the non-responsive instances. In some embodiments, the timeout period threshold corresponds to relatively short time periods (e.g., 5 ms) depending on the event type being monitored by the database instance, while in some embodiments, the timeout period threshold corresponds to a longer time frame (e.g., 5 minutes). Furthermore, in some embodiments, the amount of time before determining there is a problem (e.g., early detection time) may be represented as a percentage of the timeout period threshold. For example, the percentage may be 50% of the timeout period threshold such that after 50% of the timeout period threshold has elapsed, it is determined that there is a database communication problem (e.g., a lock problem).

In some embodiments, the early detection time may be configurable. In some embodiments the early detection time may be configurable based on a machine learning algorithm that calculates an optimal early detection time relative to the timeout period threshold. For example, if it is determined that after 50% of time has elapsed for the timeout period threshold, a very small percentage of acknowledgments may be received pass the 50% of time elapsed, setting the early detection time to be 50% may be favorable to avoid false/positives that may result if, for example, the early detection time was set for only 10% after the timeout period threshold has elapsed). Setting the early detection time too early may result in many false/positive and wasted computer system resources in initiating the issue events and possible preventative/remedial actions only to have to delete all activities mid-stream since the acknowledgement was received before the 50% timeout period, but after the early detection time. Thus, machine learning algorithm may be applied here to find the right balance between when to set the early detection time relative to the timeout period threshold to minimize false/positives, while at the same time, provide enough time after the early detection time to provide efficient and productive preventative/remedial actions.

This approach is therefore able to address network problems that may be fixable by failing over to a working network component to allow communications between the nodes/database instances to continue to process, which enables the database instance(s) to be kept running with minimum interruptions and brownout of database services.

Figure 3:
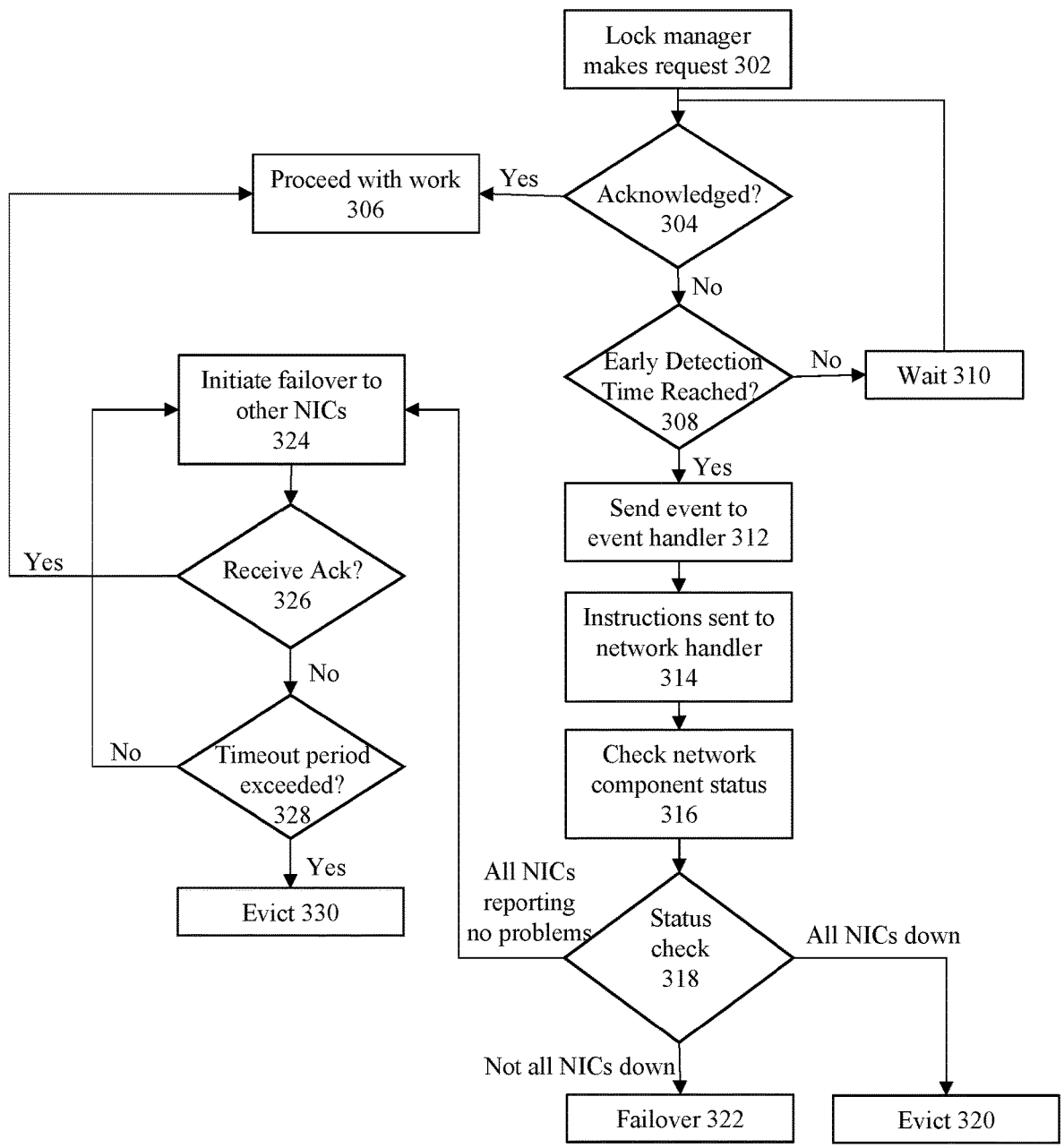
FIG. 3 illustrates a more detailed flowchart of an approach to implement some embodiments of the present disclosure.

FIG. 3 illustrates a more detailed flowchart of an approach to implement some embodiments of the present disclosure. At 302, a request is made by a lock manager. The request corresponds to the lock management processes of coordination of retrieving and releasing locks on database record(s)/object(s) between the nodes of the database cluster when the respective node has to perform work (e.g., execute a database transaction) on the database.

At 304, the DLM checks to see if the request has been acknowledged by the other node(s). If yes, then proceed to perform the work (e.g., step 306) on the database (e.g., execute the database transaction based on the acknowledgment received). However, if no acknowledgement has been received by the other node(s), then a time threshold is checked, at step 308, to determine whether or not an early detection time has been exceeded. The early detection time is the amount of time the DLM will wait to allow the system to work itself out before the DLM raises an issue event to escalate the potential issue that may result in a node eviction if not fixed. The early detection time to escalate the issue may be 50% of a timeout period threshold such that, as an example, after waiting at least half the amount of the timeout period threshold before a node may be evicted, it is time to explore proactive investigation/research into the issue to see if corrective preventative measures may be taken to resolve the issue before automatically evicting a node from the database cluster. If the early detection time has not yet been exceeded, then the processing will wait at step 310 for a configurable period of time before checking to see if the acknowledgement has been received.

Figure 4A:
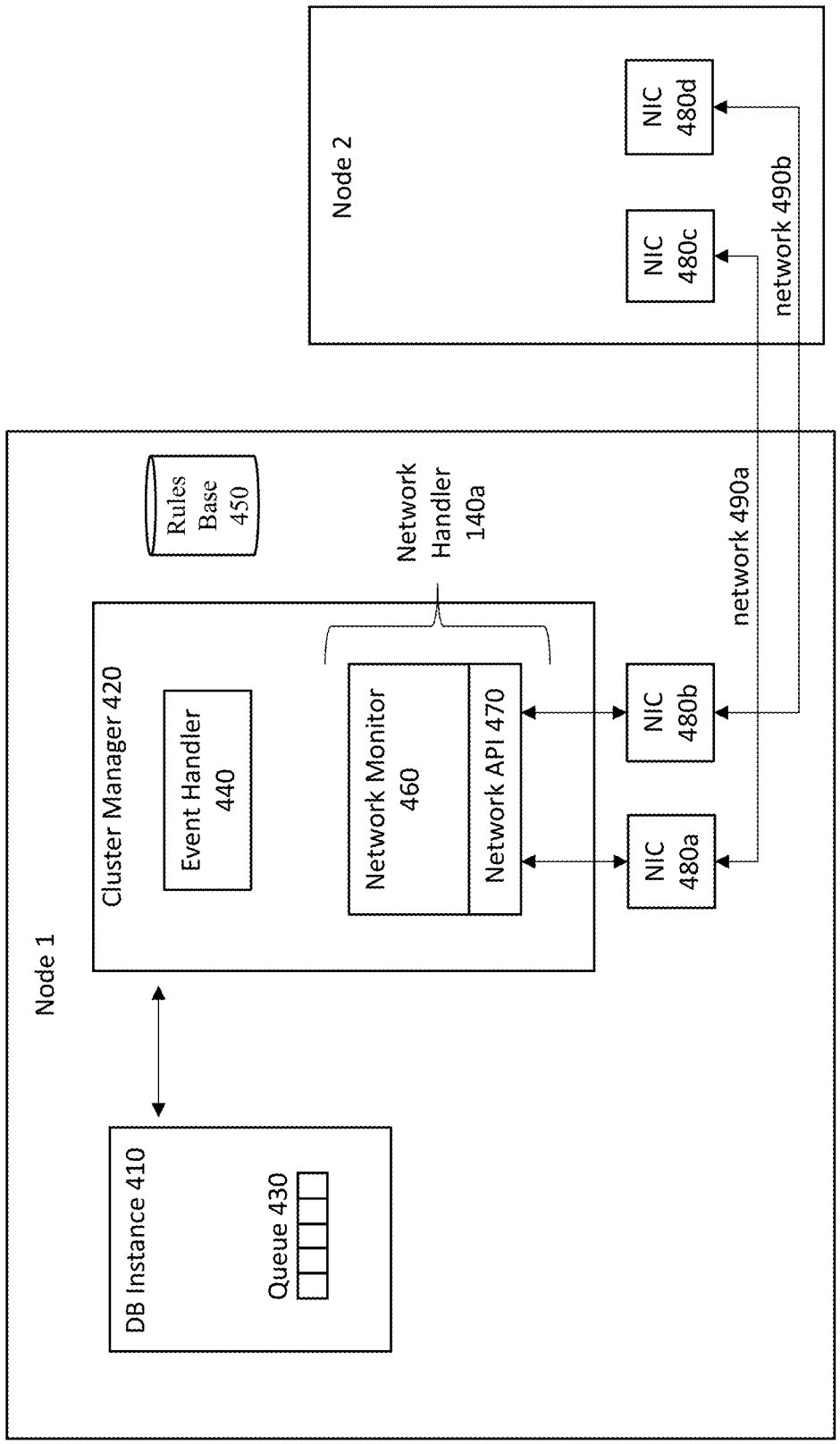
FIGS. 4A-4G illustrate an example of detecting database communication issues, according to some embodiments of the present disclosure.

If the early detection time has been reached (e.g., 50% of the timeout period threshold), then at step 312, an event is raised and sent to a high availability monitoring module 130a (e.g., an event handler 440 as depicted in FIG. 4A below) to notify the high availability monitoring module 130a of the potential issue. The event may be an electronic communication sent from the DLM to the event handler. The event may include information such as an event type, a source IP, a target IP, and a start time. The information provides information about the database transaction that is currently experiencing some problems so that downstream processes may leverage the information during issue detection and possibly take corrective actions.

The event type describes the type of event/issue that is being raised by the DLM to the event handler. For example, an event type of "No Acknowledgement Received for database lock request" may be associated with one or more rules that require an inspection of the network statuses of database NICs configured on the source node and/or the target node. The source node and/or the target node may be identified by the source IP and the target IP included within the electronic communication corresponding to the event. The start time included in the electronic communication provides the start time of the database transaction such that any processes involved in the corrective actions may determine how long the database transaction has been waiting, as an example, for the acknowledgement communication from the target node.

At 314, based on rule(s) associated with the event type (discussed further below with reference to FIG. 4A), the event handler may send instruction(s) to a network handler 140a to perform network status checks. For example, the instruction(s) may require a check on the status of NIC(s) associated with the transmission of the communication(s) for the lock management process corresponding to the database write transaction. Another embodiment may include instructions to check on the network bandwidth between the source IP and the target IP. Depending on the rule(s) associated with a particular event type, different instructions may be sent to either the network handler or other monitoring modules monitoring system components (e.g., CPU, network bandwidth, network queues, etc.).

At 316, the network handler may check the network component statuses by making calls to the NIC(s) associated with the source IP and the target IP provided in the information provided in the event. The source IP and the target IP provide the network handler the required information in order for the network handler to determine the statuses of the source NIC(s) (e.g., NIC $150_1$-$150_n$) and/or the statuses of the target NIC(s) residing on the other node(s) (e.g., node 110b-110n). Note that the DLM may be aware of the source IP (e.g., its own node) and target IP (e.g., the other node's IP address). However, the DLM may not have actual knowledge of which NIC(s) on the DLM's source node is associated with which NIC(s) on the target node. The DLM may only have knowledge that the database write transaction is still waiting for acknowledgement from the target node for the lock processing with only further knowledge of the source IP, its current node, and the target IP of the target node. The network handler 140a, on the other hand, has features and functionalities to further investigate and determine which particular NICs are associated with the source IP and target IP. With this additional knowledge, the network handler 140a may possibly identify particular NIC(s) having issues and possibly resolve network related issues for the DLM by performing NIC failover/failback processing.

At 318, the status of the source NIC(s) are determined by the network handler 140a in processing the instruction(s) received from the event handler. Based on the different statuses of the NIC(s), one of three actions may be performed: (1) at 320, immediately evict the node from the database cluster; (2) at 322, immediately failover to another NIC(s); or (3) at 324, initiate failover to other NIC(s) reporting no problems until either an acknowledgement is received or the timeout period threshold is exceeded.

At 320, the status check may have determined that all NICs associated with the database cluster on the source node are down. Since all NICs are down and not properly functioning, there are no other NICs associated with the database cluster available to failover so that communications may flow via a different NIC 150. Without a possible resolution, the network handler may inform the high availability monitoring module 130*a* that an immediate eviction is the appropriate course of action so that the high availability monitoring module 130*a* may notify a cluster manager (disclosed below) to initiate the node eviction processing immediately, even before the timeout period threshold is exceeded.

In other embodiments, based on the rule(s) associated with the event type of the event raised, there may be a need to ensure that even this type of error (e.g., where all NICs dedicated to the private network of node management within the database cluster is inoperable) does not result in an eviction of the node. Instead, the instructions to the network handler may be to establish a new public network with a NIC dedicated to connecting the source node with the target node via a public network to maintain high availability database instances. Although the computer processing cost of the setup and transmission of the communication between the nodes via the public communication channel may be costly and expensive (e.g., setup of the public network from a computing processing perspective, or the added security features of securing the messaging sent across the public network via, as an example, SSL), it may still be more preferable than to evict a node/database instance from the database cluster, where the eviction may result in systems processing costs in pausing and migrating the other processes on the node to another node as a result of the eviction of the node from the database cluster.

In other embodiments, the rules may require the network handler to configure another NIC on the node not associated with the database cluster to be used to create a private network with a NIC associated with the database cluster at the other node having the target IP. For example, the node may have other NICs dedicated to services other than the database cluster. Therefore, when all NICs dedicated to serving the database cluster are reporting failures, this embodiment may attempt to configure the NICs dedicated to services other than the database may be configured to temporarily provide a private network to process the work and avoid the node eviction.

At 322, it may be determined that the status of the NICs are not all down, but instead, some NIC(s) associated with the database cluster on the source node are still operating properly. For example, if the NIC associated with the database write transaction is down while other NIC(s) on the node are still successfully operating, the network handler 140*a* may instruct a failover from the failed NIC to a NIC that is still successfully operating on the node to resolve the current issue.

At 324, it may be determined that the status of all of the NICs on the node are successfully operating and that there are no NICs on the node that are down. In particular, although the NICs all appear to be in normal operating order, the DLM may still have not received the acknowledgement. In this embodiment, the network handler 140*a* may issue an instruction to failover from a first NIC associated with the database write transaction to a second NIC on the node that is also in normal operating order.

At 326, if the failover to the second NIC is not successful (e.g., no acknowledgement received after a short period of time), a check at 328 is made to determine if the timeout period threshold has been exceeded. If not, another attempt may be made to failover to a third NIC at 324. If all operable NICs associated with the database cluster have been attempted and no acknowledgement was received (e.g., unsuccessful remedial actions), then an eviction may be required (e.g., 330) because either the timeout period threshold will have been exceeded or because all NICs have been attempted and the database transaction still has not been acknowledged. At least in one embodiment, an acknowledgement may be received by the DLM for the database transaction during this step. In this embodiment, the database transaction is considered complete upon receipt of the acknowledgement of the database transaction and these preventative/remedial actions may cease.

Note the present disclosure provides approaches that are applicable to other types of network components and that NICs disclosed within the present disclosure are merely one example of one type of network components. One skill in the art may appreciate that preventative/remedial measures may be taken for other types of events that rely on timeout period thresholds before evicting a node from the database cluster.

Therefore, depending on the status checks received from network handler 140*a*, multiple actions may be performed to either possibly correct the issue to avoid an automatic eviction of the node or a determination that the pending issue does in fact warrant an eviction to begin immediately, which, in some embodiments, allows the node to proceed with the eviction even before the timeout period threshold for the automatic node eviction is exceeded.

FIGS. 4A-4G illustrate an example of detecting database communication issues, according to some embodiments of the present disclosure. FIG. 4A illustrates an architecture for performing some embodiments of the present disclosure. Node 1 may include a database instance 410, cluster manager 420, rules database 450, and NICs 480. Database instance 410 is a set of memory structures and processes that manage database files. A database is a set of physical files on disk. The database instance 410 manages its associated data and serves the users (e.g., application/web servers 118) of the database.

The database instance 410 may include a messaging queue 430 where communications/messages to be communicated to other nodes are queued up for processing. Communications/messages that are stored in the messaging queue 430 may include lock management transactions for communicating with other nodes within the database cluster to process, as an example, a database write transaction. Messages remain in the messaging queue 430 until the messages are processed, at which time, the processed message(s) within messaging queue 430 may be removed from the queue.

Cluster manager 420 enables the servers/nodes to communicate with each other, so that they appear to function as a collective unit. This combination of servers is commonly known as a cluster. Although the servers are standalone servers, each server has additional processes that communicate with other servers. In this way, the separate servers appear as if they are one system to applications and end users. Cluster manager 420 provides the infrastructure necessary to run the database cluster 122. Cluster manager 420 also manages resources, such as virtual IP (VIP) addresses, databases, listeners, services, and so on.

Cluster manager 420 may include a high availability monitoring module 130*a* (hereinafter referred to as "event handler 440") and network handler 140*a*. The event handler 440 receives events from the database instance 410 when certain events require further investigation and/or resolution of potential issues. The event handler, upon receiving an event from the database instance 410 may identify the event type associated with the event. Based on the event type, the event handler may query a rule database 450 to determine instructions for handling the event type.

Rules database 450 stores a plurality of rules for handling different types of events raised by database components (e.g., DLM) of the database instance 410. The rules stored within the rules database 450 may include rules authored by system administrators, machine learning algorithms, etc.

Network handler 140a, as depicted in FIG. 4A, may include a network monitor 460 and a network API layer 470. Network monitor 460 may include pre-built network monitoring functionalities such as request network status, update network status, ping/heartbeat different nodes/NICs in the network, request status of NIC(s), etc. The network monitor 460 provides the functionalities and features to monitor the general health of the network such as the network components and the traffic of the overall network transmitted via the network components. Additionally, the network monitor 460 may also include functionalities for performing failover processing from, as an example, a first network adapter (e.g., NIC) to a second network adapter as well as for performing failback process from the second network adapter back to the first network adapter.

For example, if an event originating from a first node having a source IP is having problems communicating with a second node having a target IP, the network monitor 460 may reconfigure the communication between the source IP and the target IP by reconfiguring which network adapter(s) on the first node and/or the second node should handle the private network connection(s) between the first node and/or the second node by reconfiguring the pathways between the source IP and the target IP by failing over and/or failing back between the different available NICs within the respective nodes. The network monitor may identify a first NIC on the first node and a second NIC on the second node such that the first NIC on the first node is associated with the source IP and the second NIC on the second node is associated with the target IP. The first NIC and the second NIC providing a first private network communication channel between the first node and the second node. The network monitor may remove an association of the first NIC from the source IP. The network monitor 460 may also configure a third NIC on the first node to associate the source IP with the third NIC such that the third NIC and the second NIC provide a second private network communication channel between the first node and the second node.

Network API layer 470 includes pre-built application programming interfaces (APIs) for allowing the network monitor 460 to monitor, communicate with, and configure the different NIC(s) configured on node 1 and/or configured on other nodes within the database cluster 122. Different network API(s) may be used for different NIC(s) 480 that are manufactured and/or produced by different hardware/software providers.

NIC 480a may be configured as a network adapter for providing a first private network (e.g., network 490a) interconnecting node 1 with node 2 (e.g., NIC 480a with NIC 480c). NIC 480b may also be configured as a network adapter for providing a second private network (e.g., network 490b) interconnecting node 1 with node 2 (e.g., NIC 480b with NIC 480d). For simplicity of explanation, only two NICs 480 are depicted on each node in the figures. One of ordinary skill in the art may appreciate there may be more than two NICs 480 configured any node. Additionally, the current example depicts two private network interconnecting node 1 with node 2 to for ease of explanation of the present disclosures. One of ordinary skill in the art may appreciate there may be embodiments having more than two private network interconnecting nodes within the database cluster, as well as including maybe at least one public network connecting the nodes with a public network using other NICs 480.

Figure 4B:
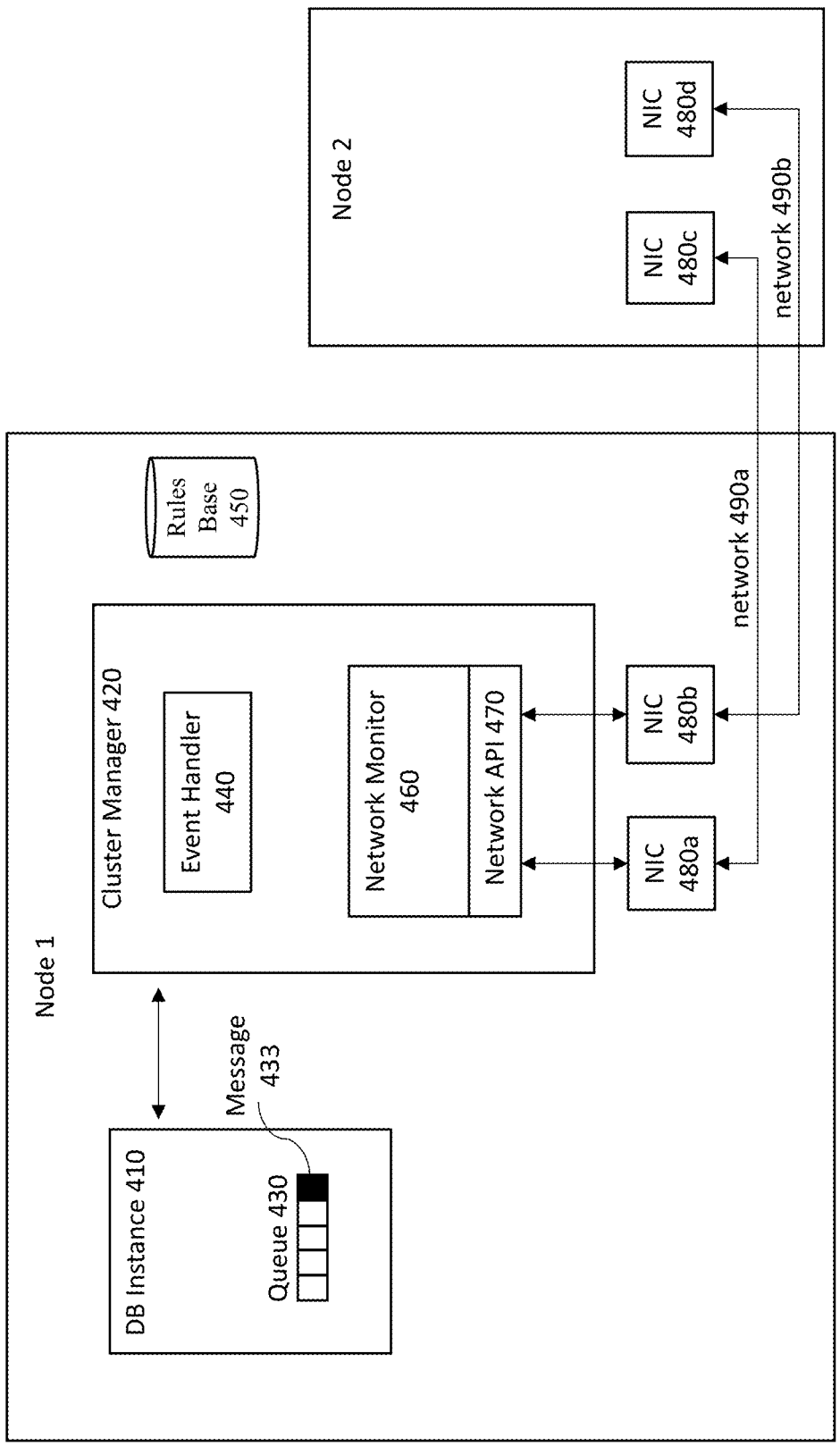

FIG. 4B illustrates a new message 433 added to the messaging queue 430 as a result, for example, of a database write transaction to write data to storage pool 104 (as depicted in FIG. 1). Since the database write transaction in the clustered database requires coordination with other nodes within the database cluster to receive a lock on an object corresponding to the database write transaction, a communication of the intent to lock the object in the storage pool to perform the database write transaction is logged in the messaging queue 430 for processing by a DLM 120a.

Figure 4C:
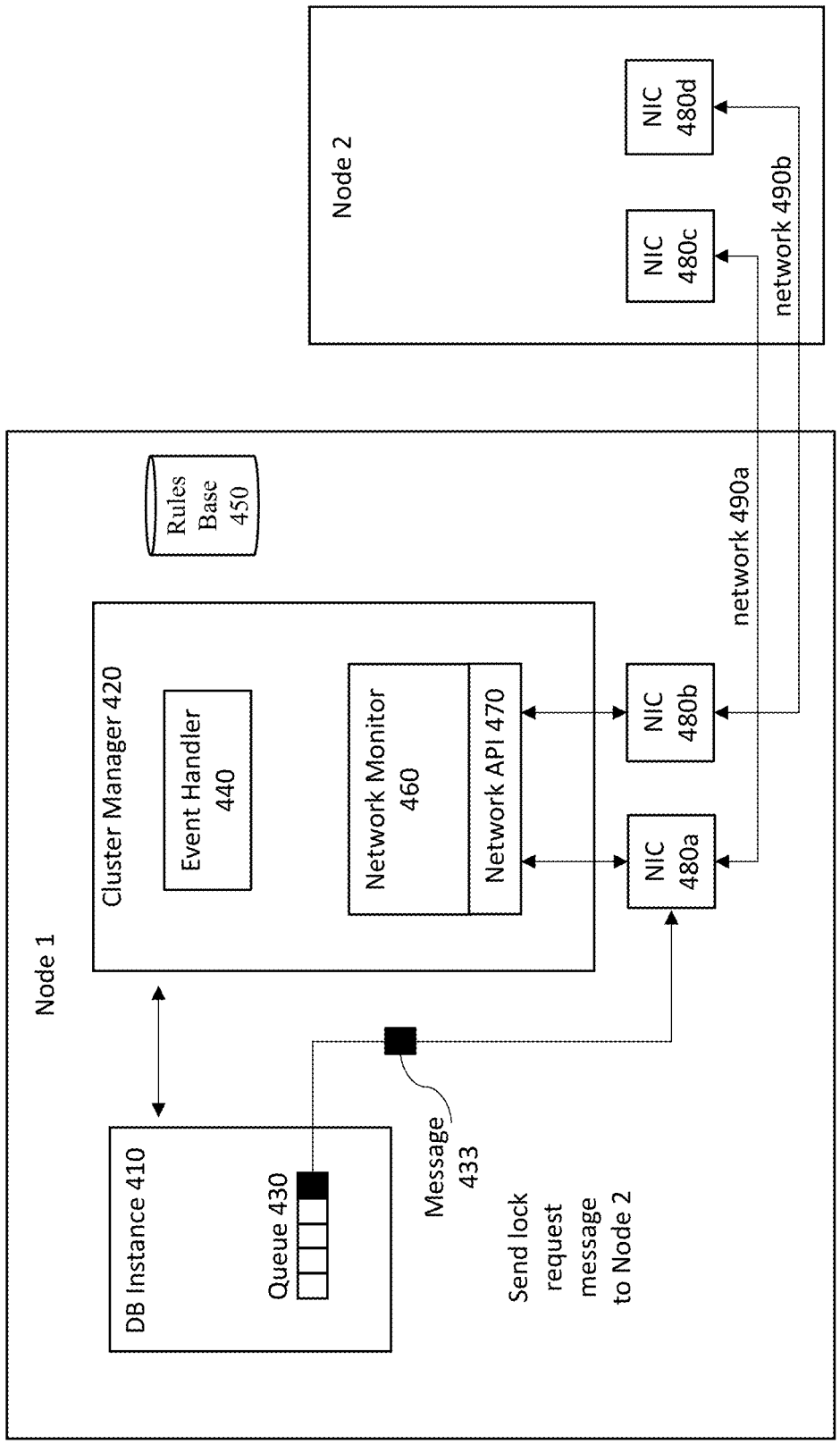

FIG. 4C illustrates the DLM sending the lock request message 433 associated with the database write transaction to node 2 for processing the database lock via NIC 480a. As discussed above, the current configuration of the private network for node 1 to communicate with node 2 may be via network 490a connected by NIC 480a and NIC 480c for the current message 433. As depicted, the lock request message 433 is currently routed via NIC 480a and NIC 480c via network 490a.

Figure 4D:
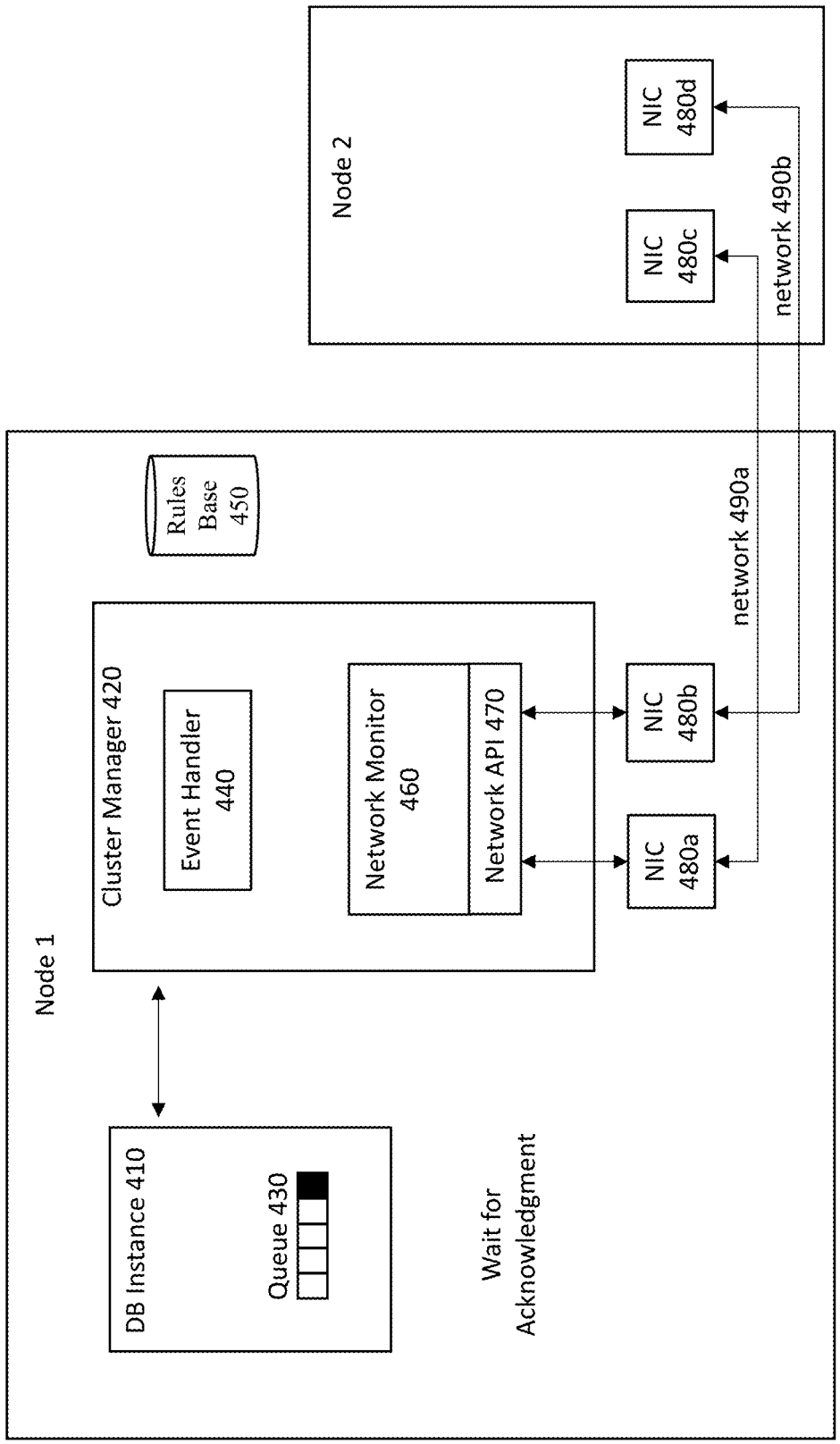
Figure 4E:
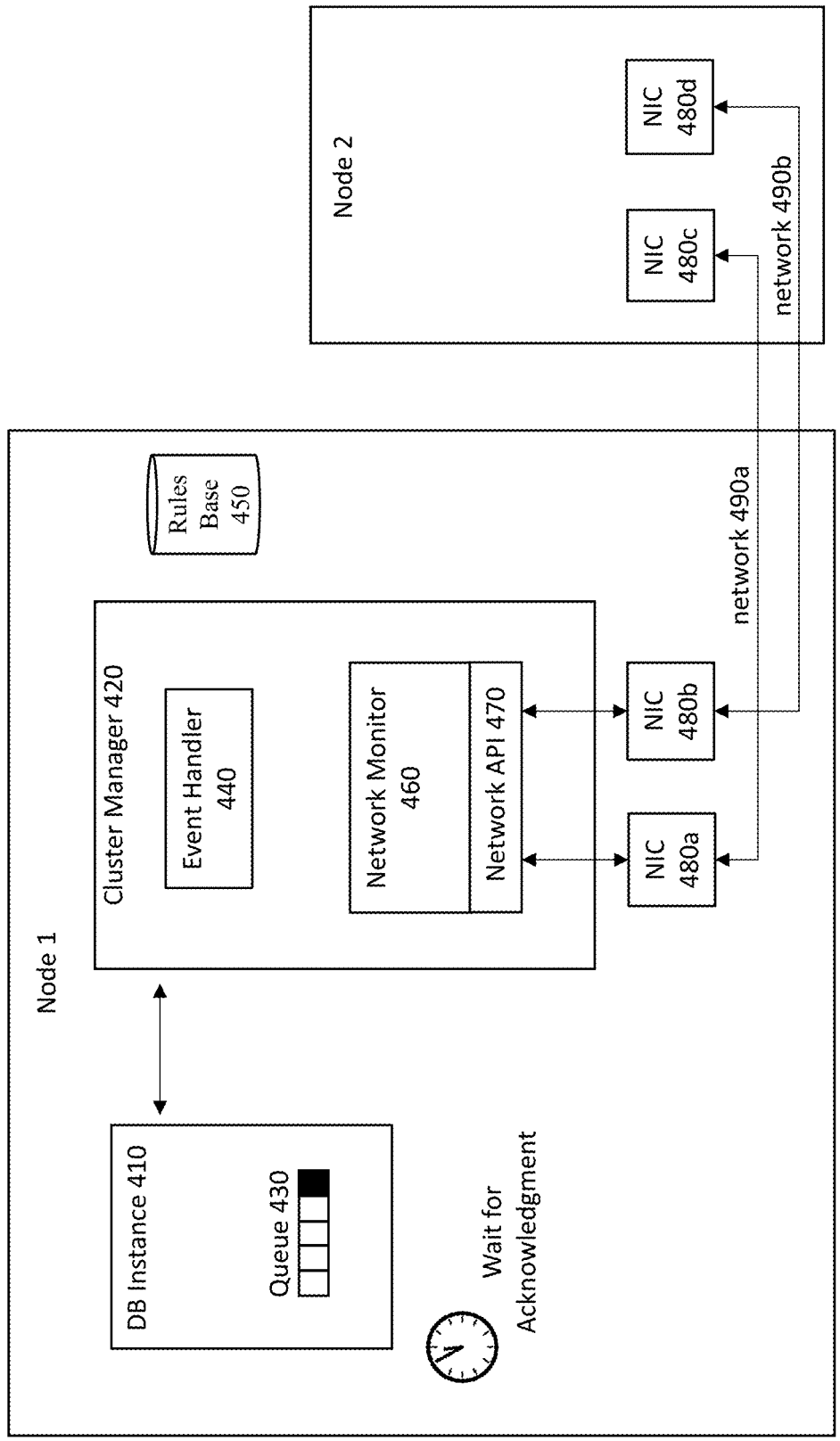
Figure 4F:
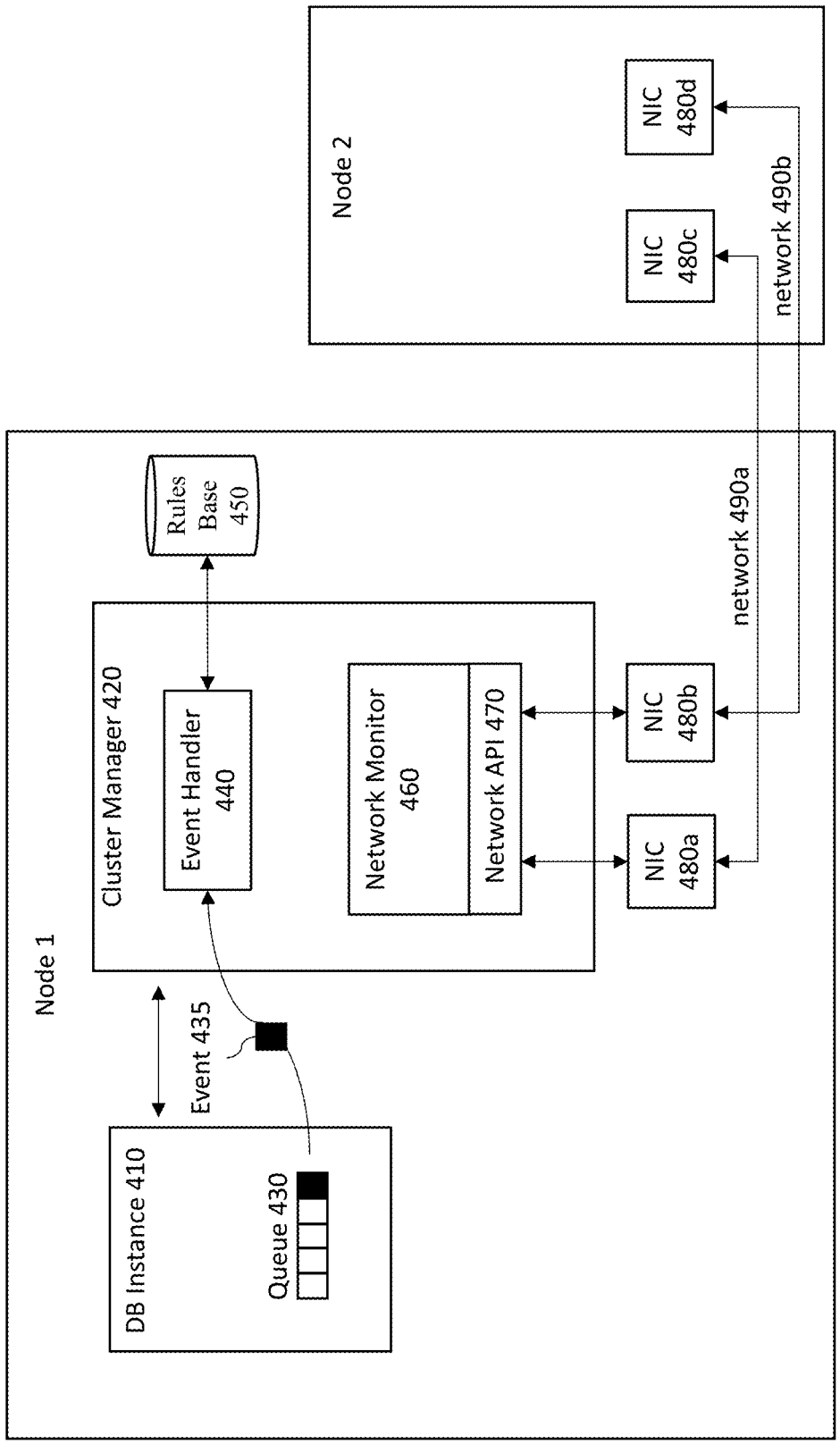

FIG. 4D illustrates the DLM waiting for acknowledgement from node 2 for the lock request. FIG. 4E illustrates that the early detection time has been exceeded as depicted by the clock. FIG. 4F illustrates an event 435 is created/raised and sent to event handler 440. As discussed above, the event 435 may include the event type, a source IP, a target IP, and a start time of the message 433 within message queue 430 (as depicted on FIG. 4B). The event handler 440 may query rules database 450 to determine appropriate actions to perform based on an event type associated with event 435. For example, event 435 may include an event type of "lock manager communication exceeds early detection time." There may be at least one rule in the rules database 450 associated with the event type of "lock manager communication exceeds early detection time."

Figure 4G:
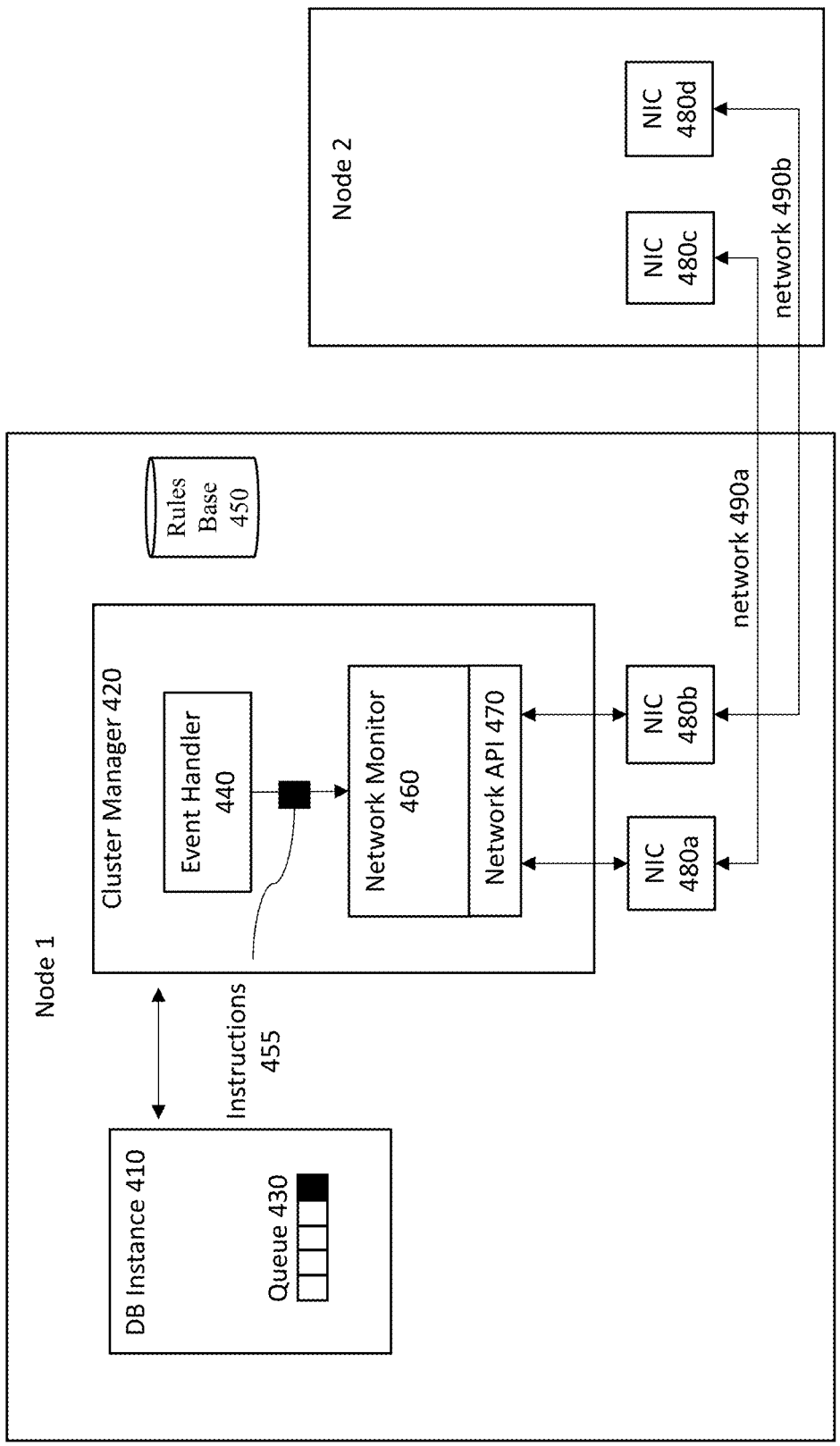

FIG. 4G illustrates the event handler 440 sending instruction(s) 445 to network monitor 460 to investigate and/or resolve the current event raised. The instruction(s) 445 may include instruction(s) for the network monitor 460 to determine the status of the NICs providing the private network 490a between the source IP from node 1 to the target IP on node 2 as provided in the event. Network monitor 460 may execute the instructions by making API calls to the NIC(s) residing on node 1 via the network API layer 470. The results of the status of the NICs may be returned to the network monitor 460 so that the network monitor 460 may determine the appropriate action to pursue to help resolve the issue triggering event 435.

Figure 4H:
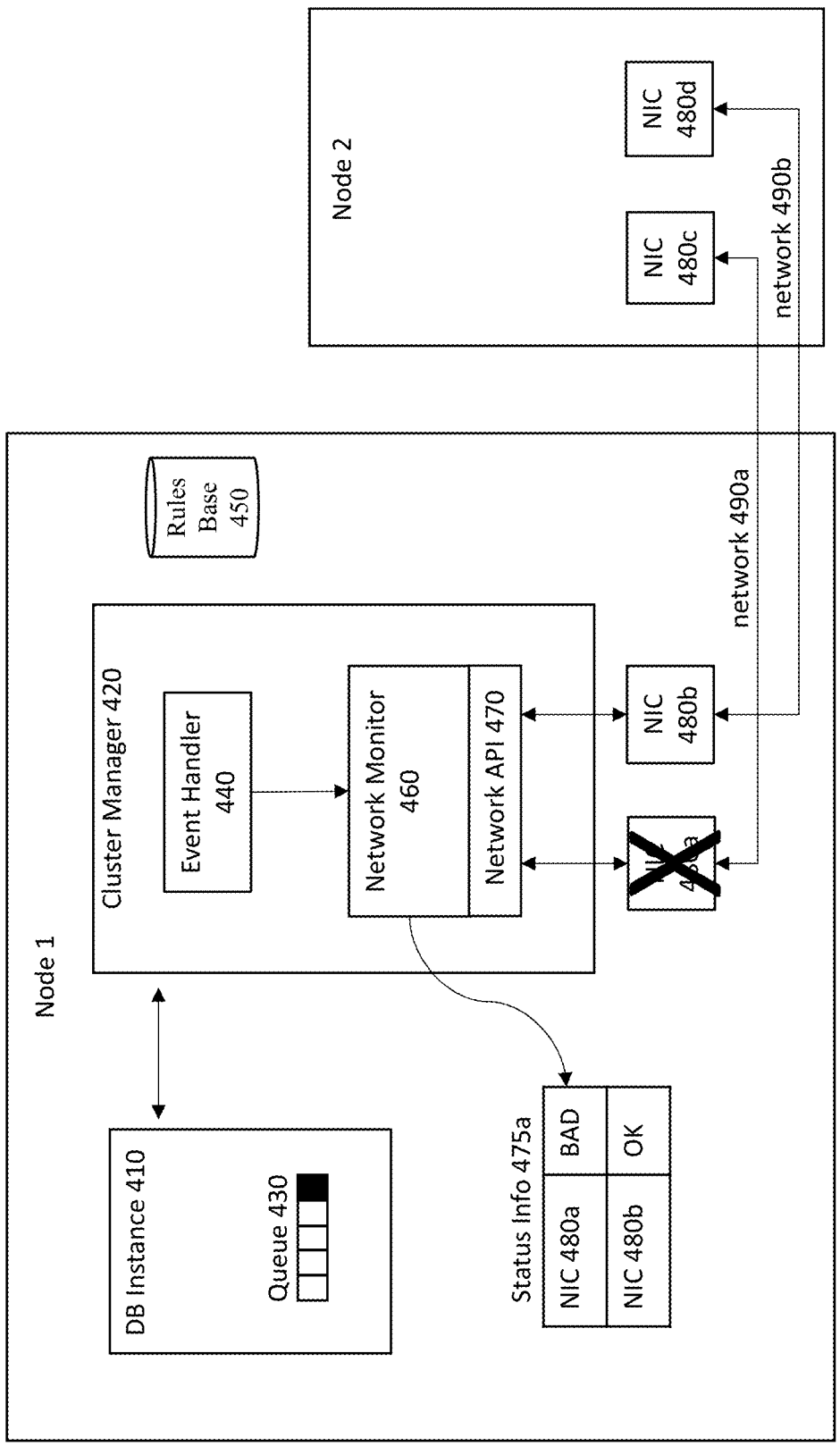
FIGS. 4H-4J illustrate examples of determining different database communication issues, according to some embodiments of the present disclosure.
Figure 4I:
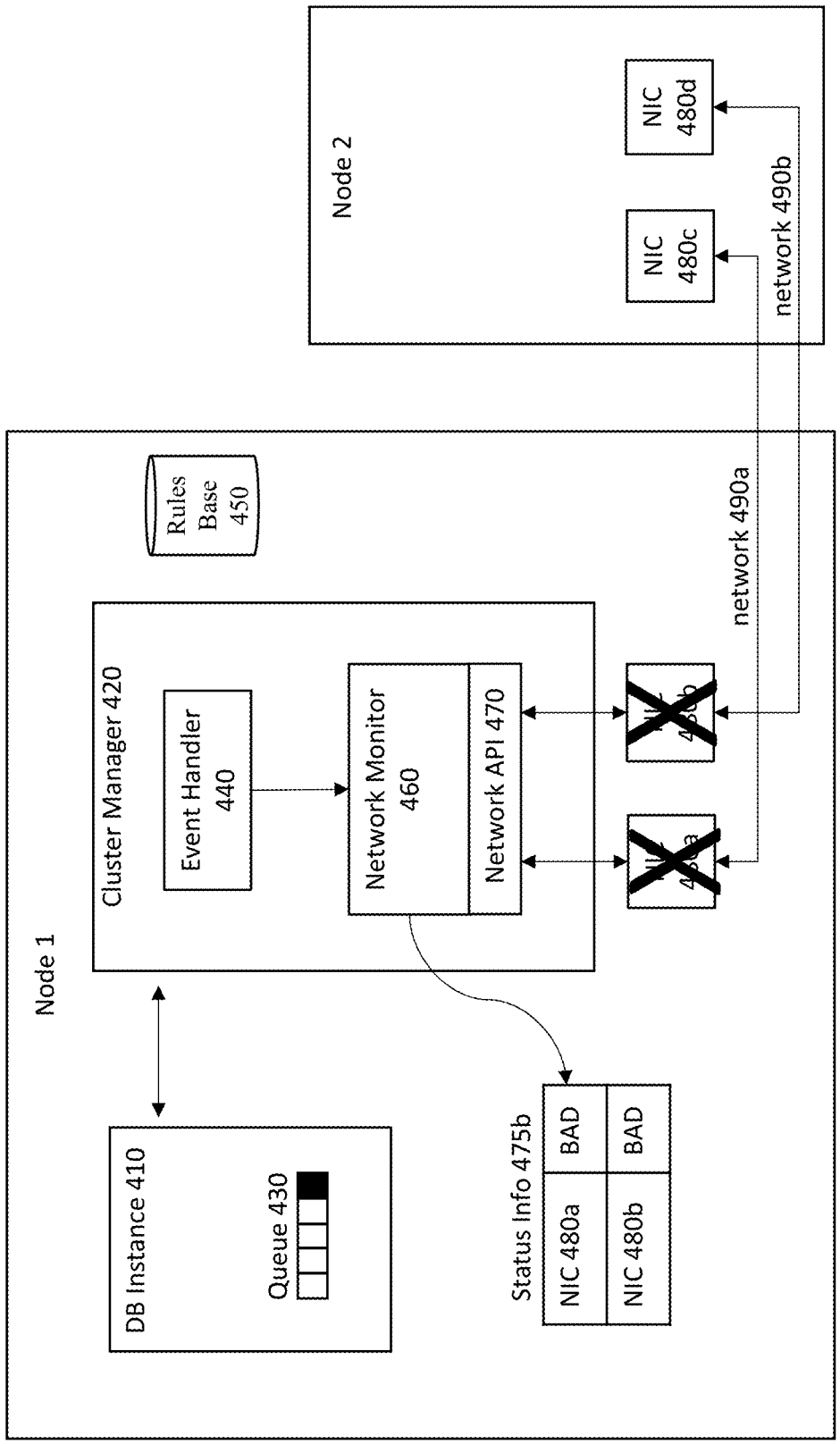
Figure 4J:
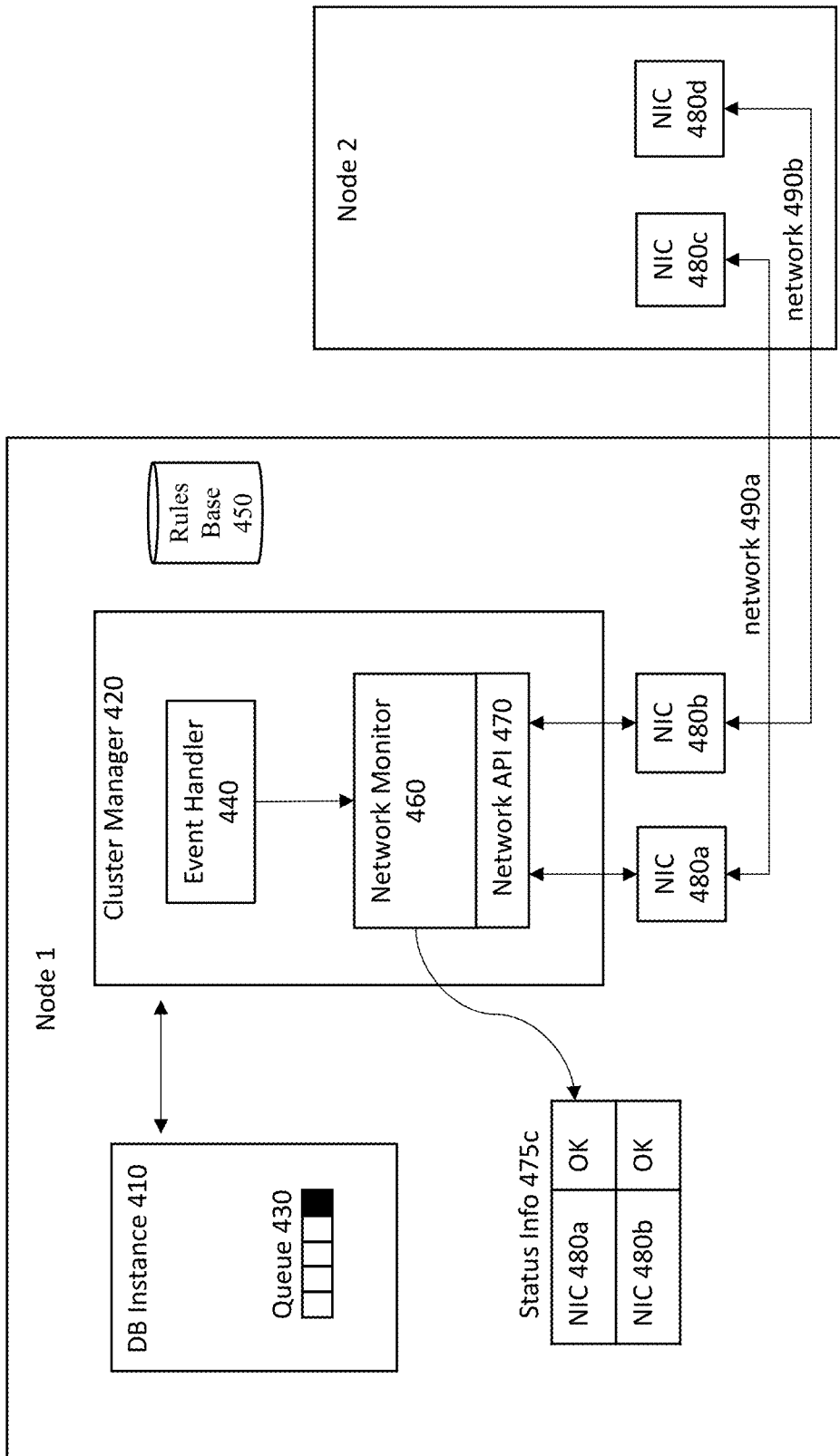

FIGS. 4H-4J illustrate examples of determining different communication issues, according to some embodiments of the present disclosure. FIG. 4H illustrates a scenario where the network monitor 460 has determined that NIC 480a is BAD and that NIC 480b is OK. FIG. 4I illustrates a scenario where the network monitor 460 has determined that both NIC 480a and NIC 480b are BAD. FIG. 4J illustrates a scenario where the network monitor 460 has determined that both NIC 480a and NIC 480b are OK.

Figure 5A:
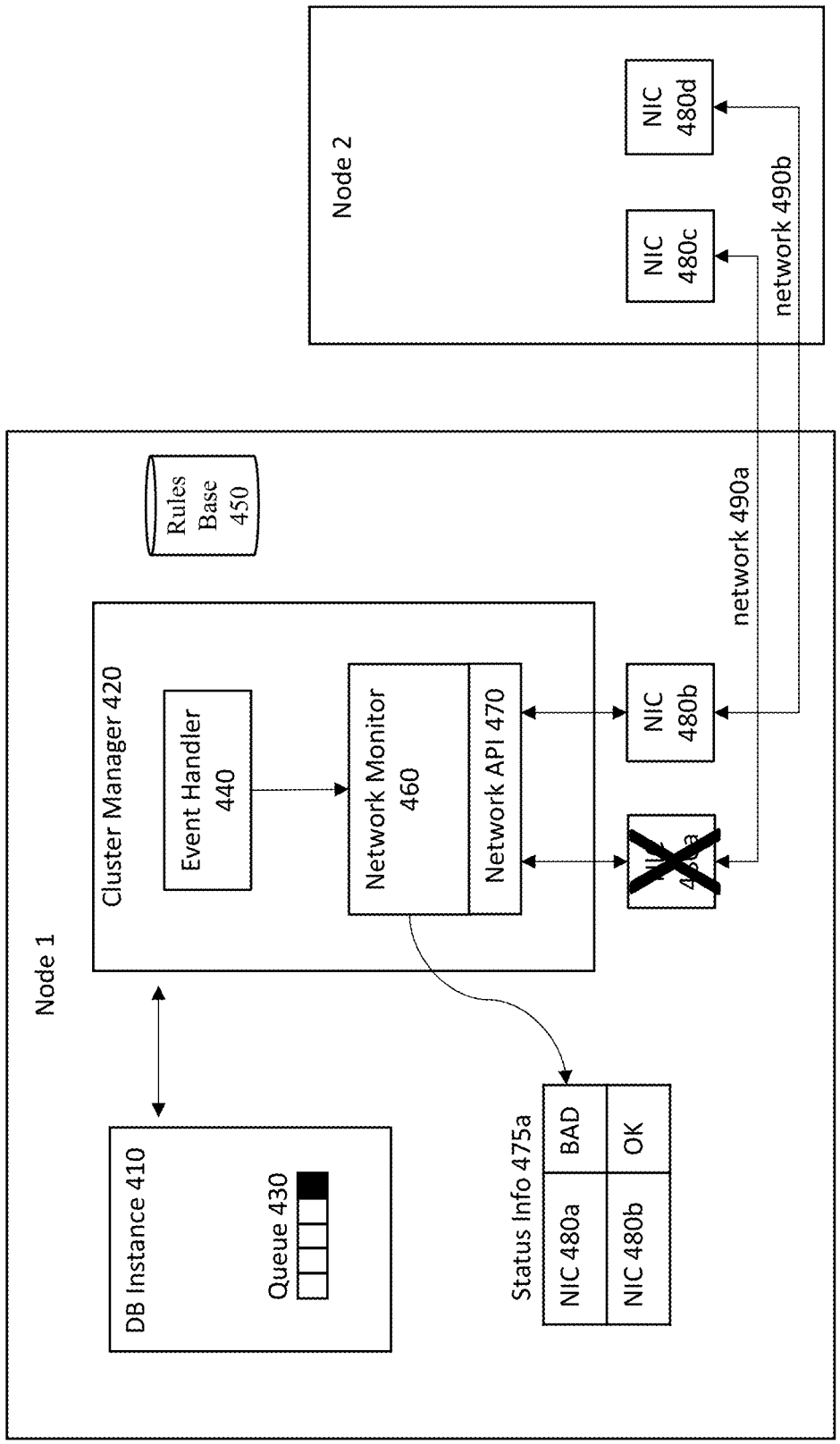
FIGS. 5A-5E illustrate an example of performing a corrective action based on the database communication issue depicted in FIG. 4H, according to some embodiments of the present disclosure.

FIGS. 5A-5E illustrate an example of performing a corrective action based on the communication issue depicted in FIG. 4H, according to some embodiments of the present disclosure. FIG. 5A illustrates that according to the results obtained by network monitor 460, NIC 480a is BAD (e.g., not functioning properly). NIC 480a is currently the NIC configured to providing the private network 490a with NIC 480c from the second node for this particular lock manager request as illustrated in FIG. 4C.

Figure 5B:
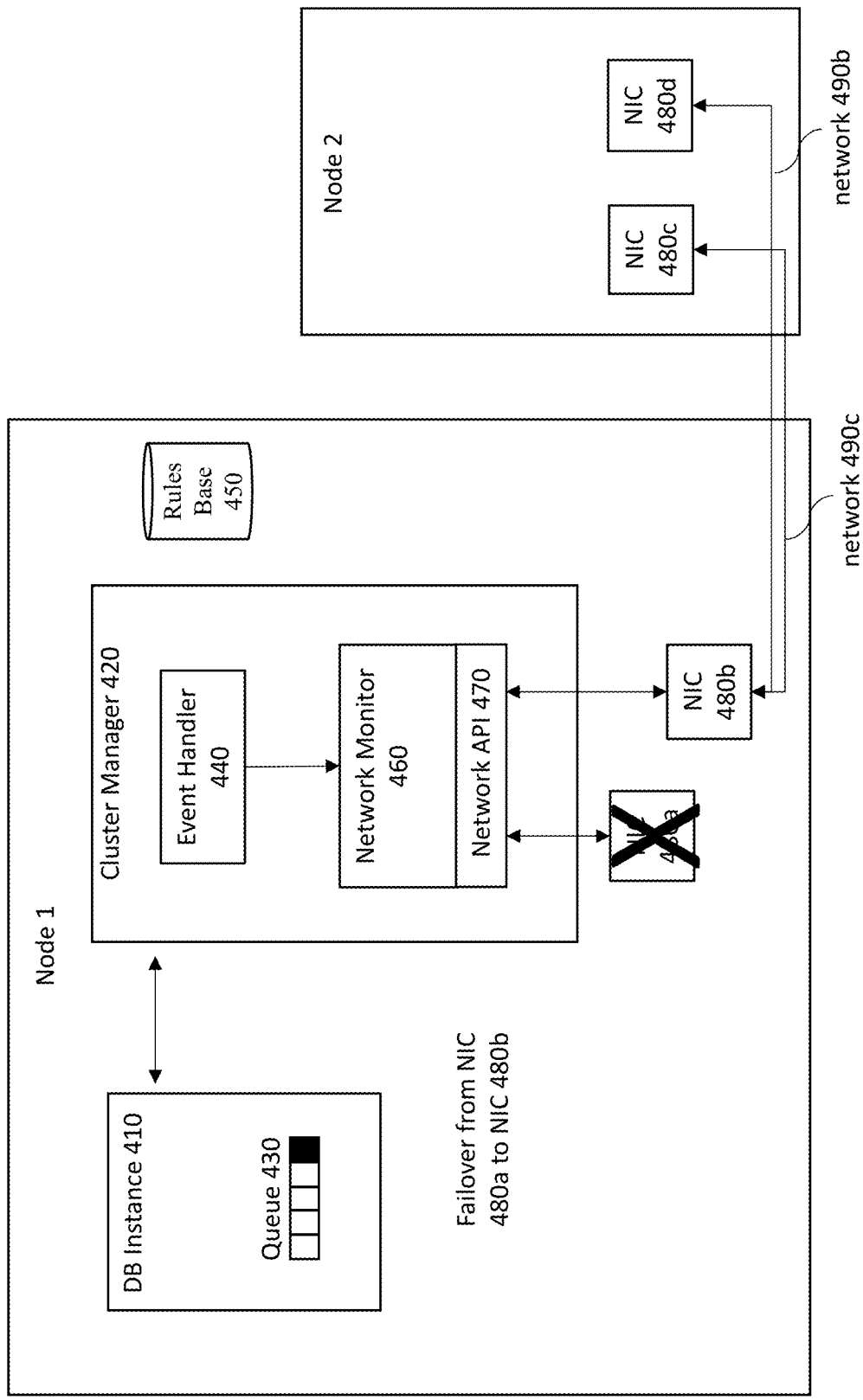

FIG. 5B illustrates that based on the determination that NIC 480a is BAD and that NIC 480b is OK, the network monitor 460 may issue API calls to NIC 480a to failover to NIC 480b. This may be accomplished by reconfiguring the communication path from the source IP to the target IP, identified in the event 425, to use NIC 480b instead of NIC 480a to manage the communication from the source IP to the target IP via a different private network 490c. Before the failover of NIC 480a to NIC 480b, NIC 480b is configured to communicate with NIC 480d via private network 490b. After the failover, NIC 480b may be configured to communicate with NIC 480c and/or NIC 480d via private network 490c or via private network 490b, respectively.

Figure 5C:
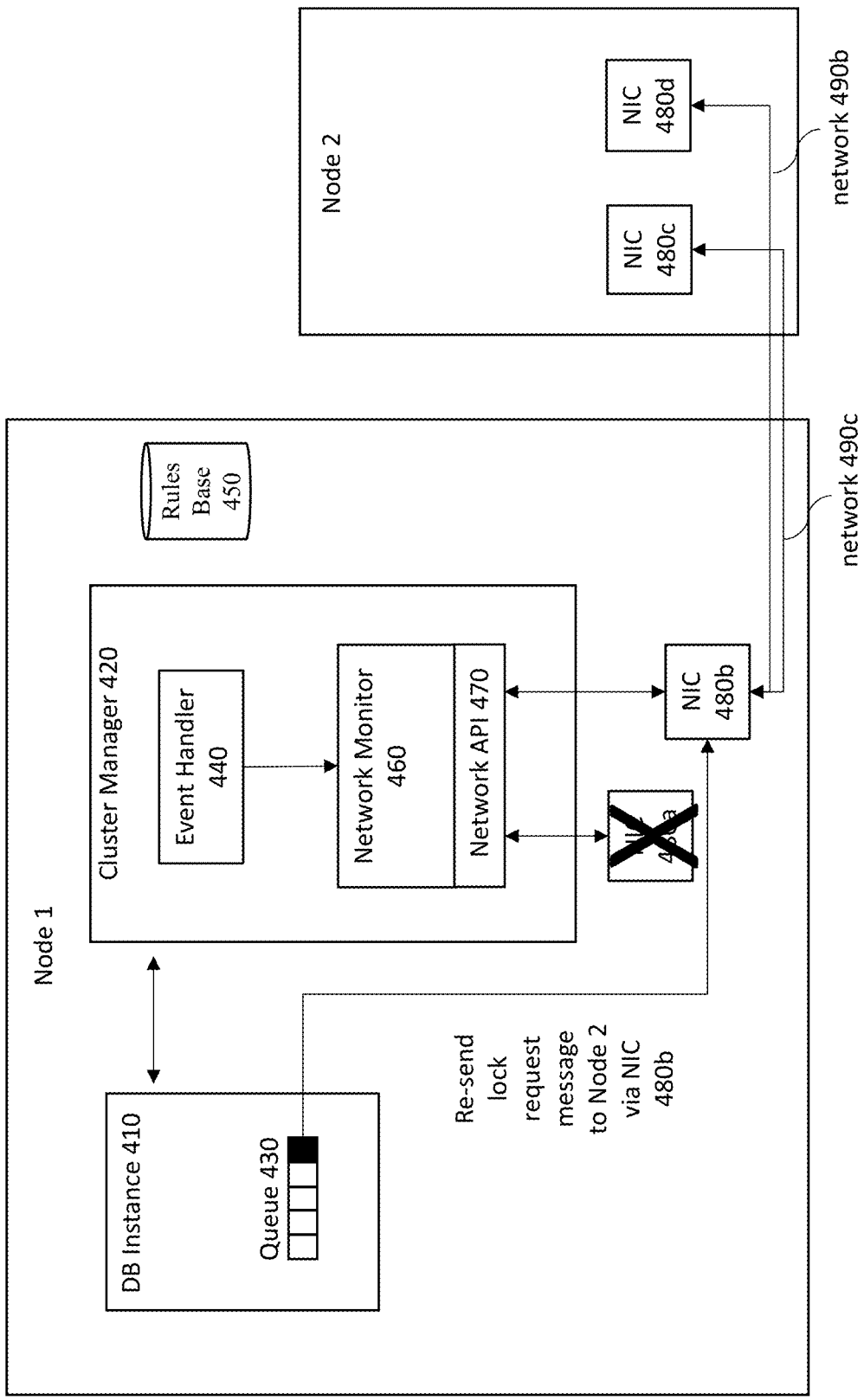
Figure 5D:
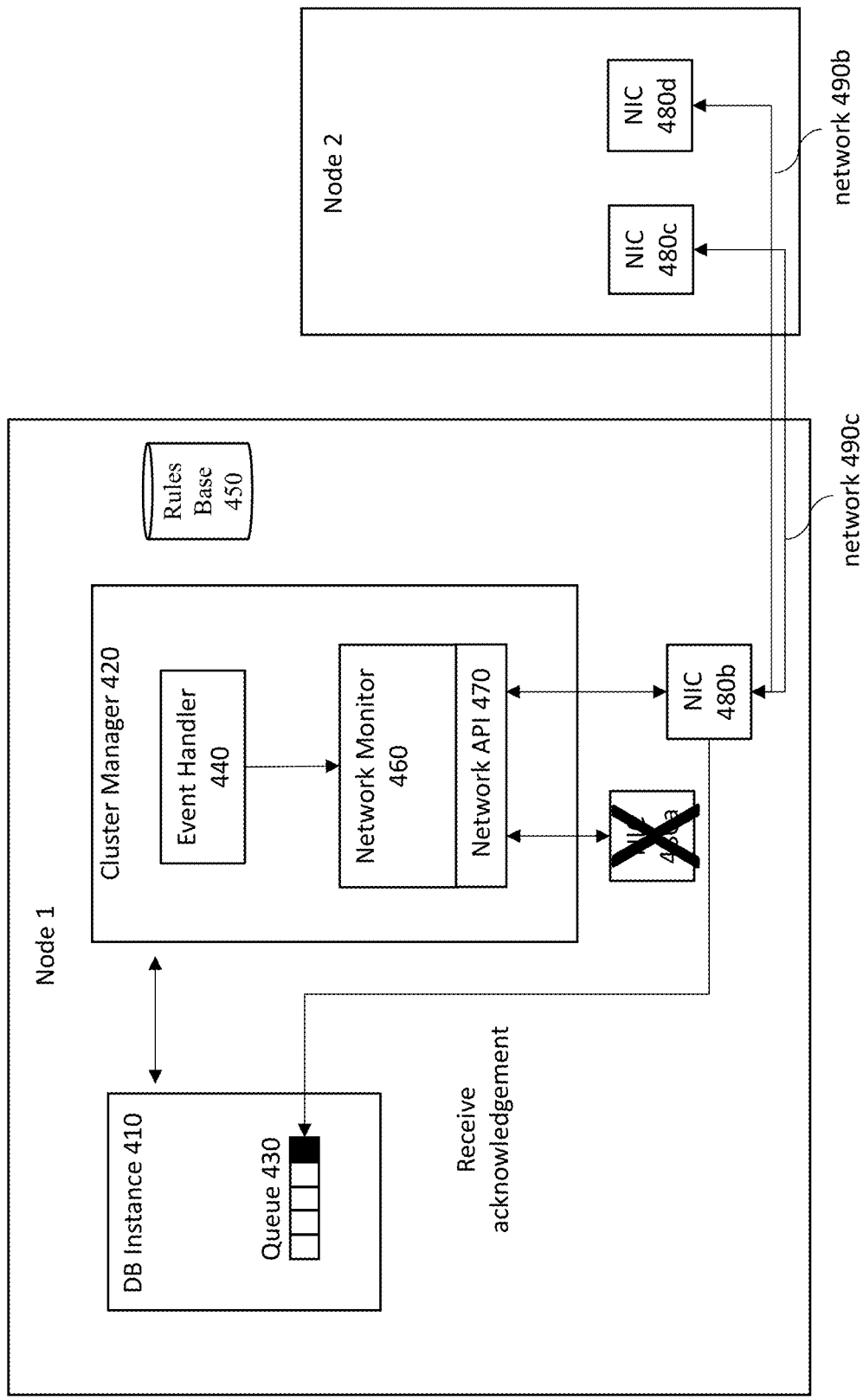
Figure 5E:
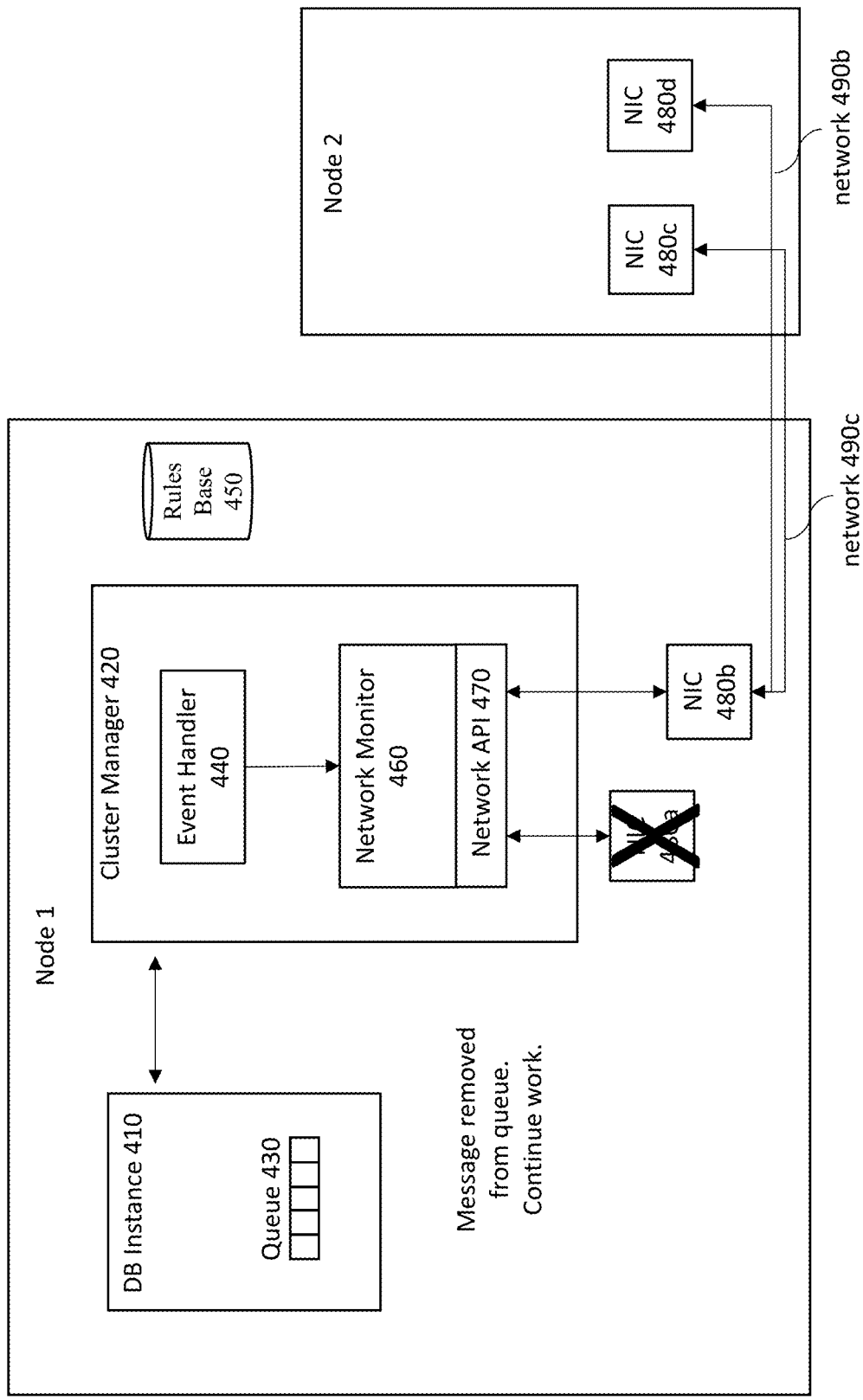

FIG. 5C illustrates that after reconfiguring the private network from node 1 to node 2 from NIC 480a to NIC 480b, the lock request message 433 is resubmitted to node 2 via NIC 480b through the new private network 490c to NIC 480c on node 2. FIG. 5D illustrates a successful acknowledgement is received from node 2 associated with the message 433 (e.g., normal lock manager processing is completed). As a result, FIG. 5E illustrates that the message 433 is removed from message queue 430 and processing continues on the database instance 410. In some embodiments, not depicted in figures, the network monitor 460 may failback from NIC 480b to NIC 480a after a period of time has elapsed or after network monitor 460 receives an updated status that NIC 480a is OK again to relieve the additional workload transferred to NIC 480b during the failover.

Figure 6A:
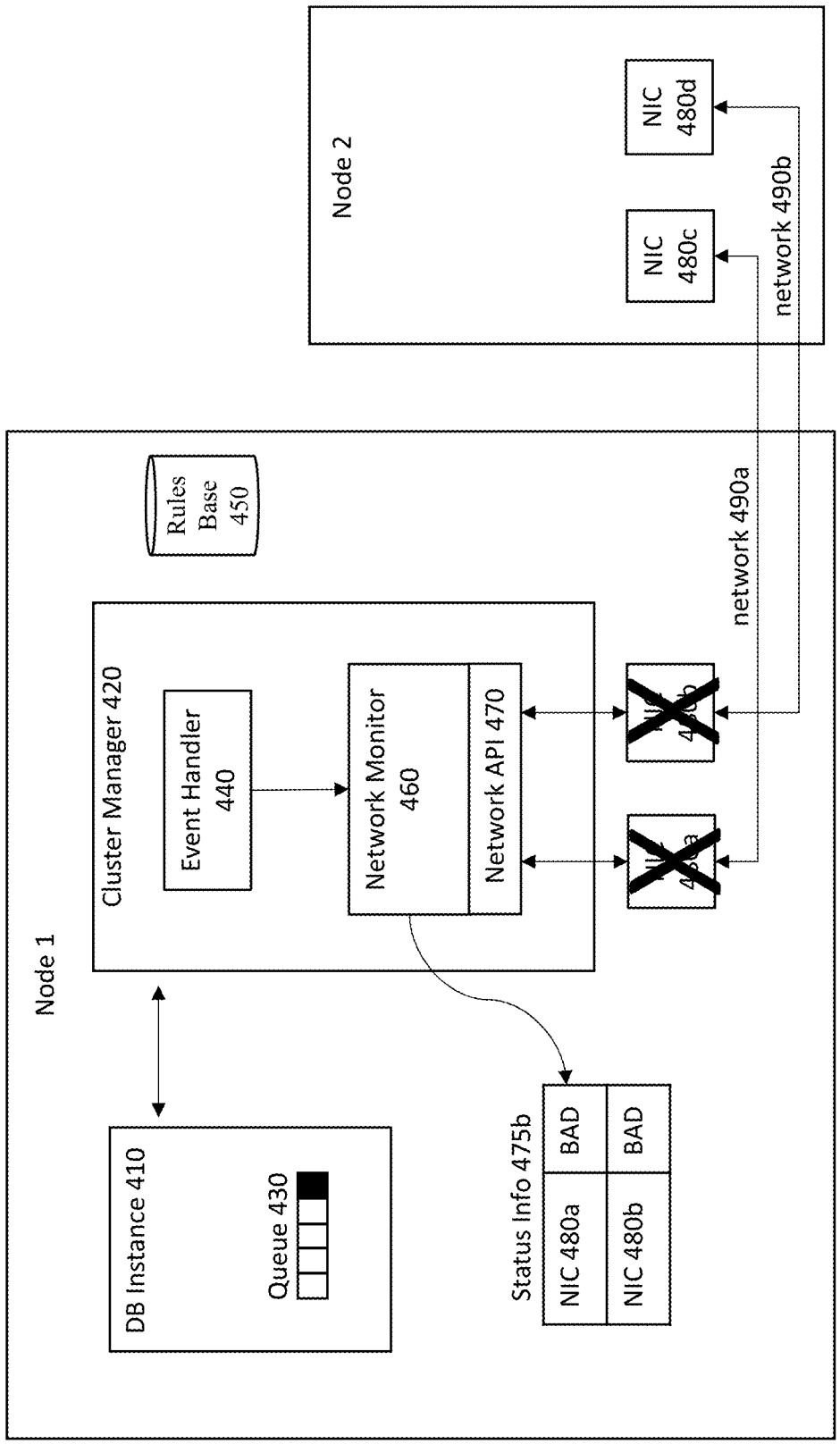
FIGS. 6A-6B illustrate an example of performing a corrective action based on the database communication issue depicted in FIG. 4I, according to some embodiments of the present disclosure.
Figure 6B:
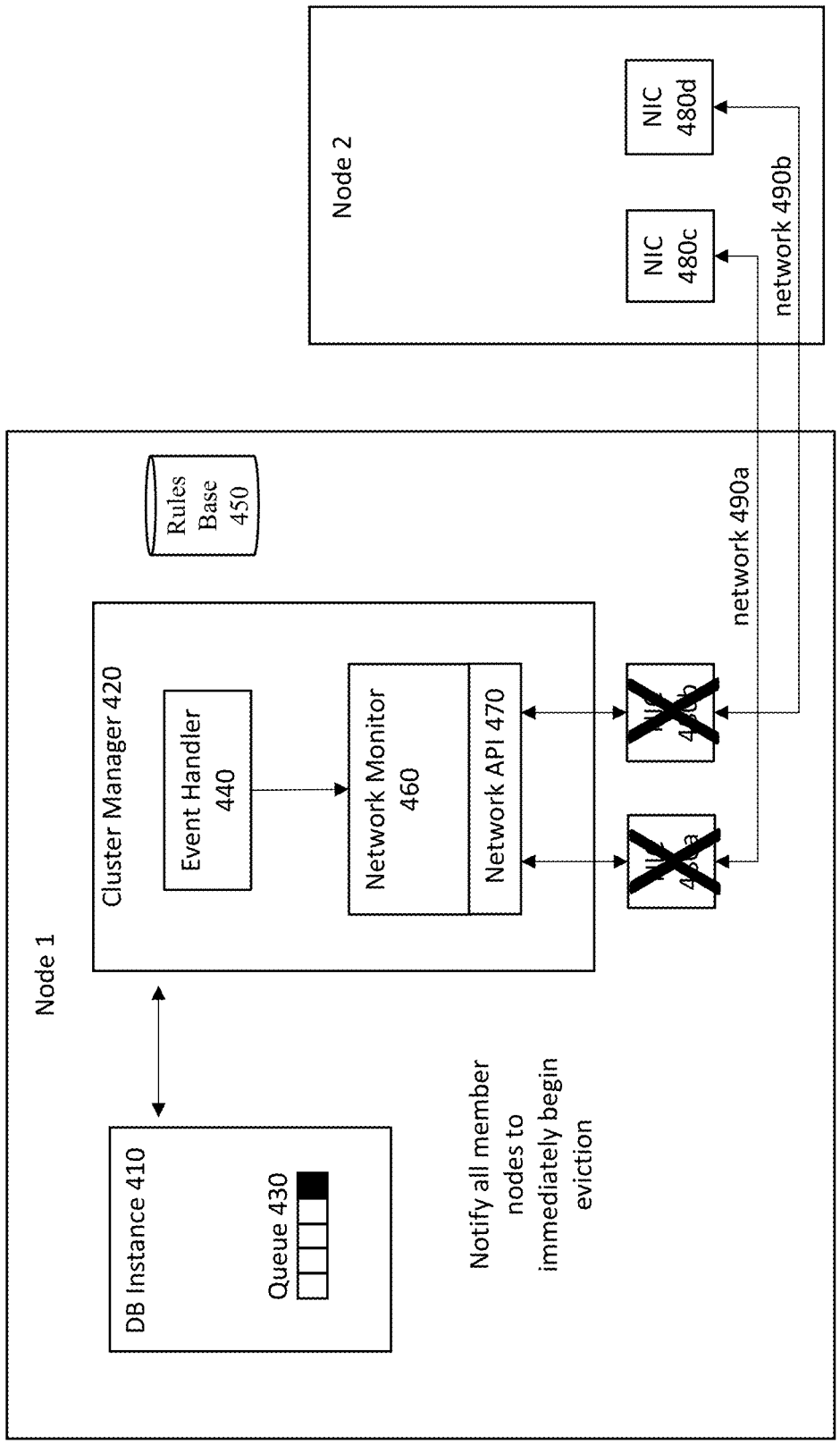

FIGS. 6A-6B illustrate an example of performing a corrective action based on the communication issue depicted in FIG. 4I, according to some embodiments of the present disclosure. FIG. 6A illustrates that according to the results obtained by network monitor 460, both NIC 480a and NIC 480b are BAD (e.g., not functioning properly). As discussed above, NIC 480a is currently the NIC configured to providing the private network 490a communications with NIC 480c from the second node for this particular lock manager request as illustrated in FIG. 4C.

FIG. 6B illustrates that based on the determination that both NIC 480a and NIC 480b are BAD, the network monitor 460 may notify the cluster manager 410 to immediately notify all nodes in the database cluster to begin the eviction process of the node 1 since all of the NICs providing the private networking communication channels to other node(s) in the database cluster have failed, and thus, rather than waiting until the full timeout period threshold is reached to initiate eviction, the other node(s) in the cluster should initiate the eviction process immediately to minimize (a) total processing time delay for the database transaction, and (b) brownout time experienced while waiting for the timeout period threshold to be exceeded. Further details regarding methods and mechanisms for notifying all nodes in the database cluster to begin the eviction process before the timeout period threshold is exceeded are described in related U.S. application Ser. No. 16/165,314, filed on even date herewith, entitled "METHOD AND SYSTEM FOR A SPEED-UP CLUSTER RECONFIGURATION TIME VIA A GENERIC FAST SELF NODE DEATH DETECTION" which is hereby incorporated by reference in its entirety.

In other embodiments not illustrated in the figures, a rule may instruct the network monitor 460 to establish a public network between node 1 and node 2 in the event all private networks between the nodes are not operational. A node may include a plurality of NICs wherein a first portion of the NICs are configured to provide the private network for nodes of the cluster to communicate with one another. A second portion of the NICs on the nodes may be configured to provide public networks (e.g., internal LANs, WANs, etc.) Although this may be an expensive option (e.g., expensive in terms of computing resources to establish and secure a public network connection to provide the communication between nodes for handling cluster management), there may be situations where this alternative resolution may be more favorable than an eviction process itself since the eviction process may introduce system downtime and/or brownouts.

Figure 7A:
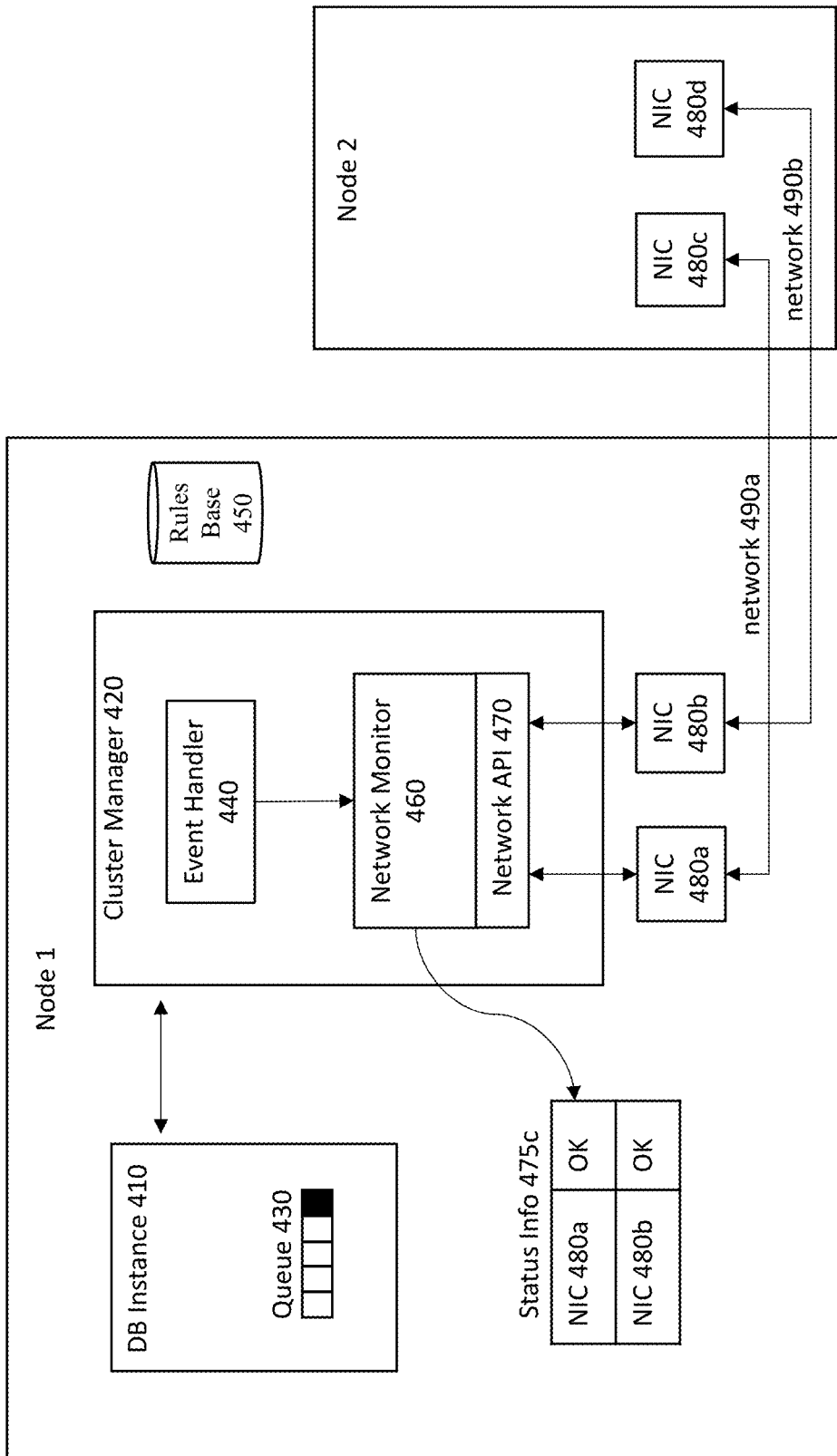
FIGS. 7A-7E illustrate an example of performing a corrective action based on the database communication issue depicted in FIG. 4J, according to some embodiments of the present disclosure.

FIGS. 7A-7E illustrate an example of performing a corrective action based on the communication issue depicted in FIG. 4J, according to some embodiments of the present disclosure. FIG. 7A illustrates that according to the results obtained by network monitor 460, both NIC 480a and NIC 480b are OK (e.g., functioning properly). As discussed above, NIC 480a is currently the NIC configured to providing the private network 490a communications with NIC 480c from the second node for this particular lock manager request as illustrated in FIG. 4C.

Figure 7B:
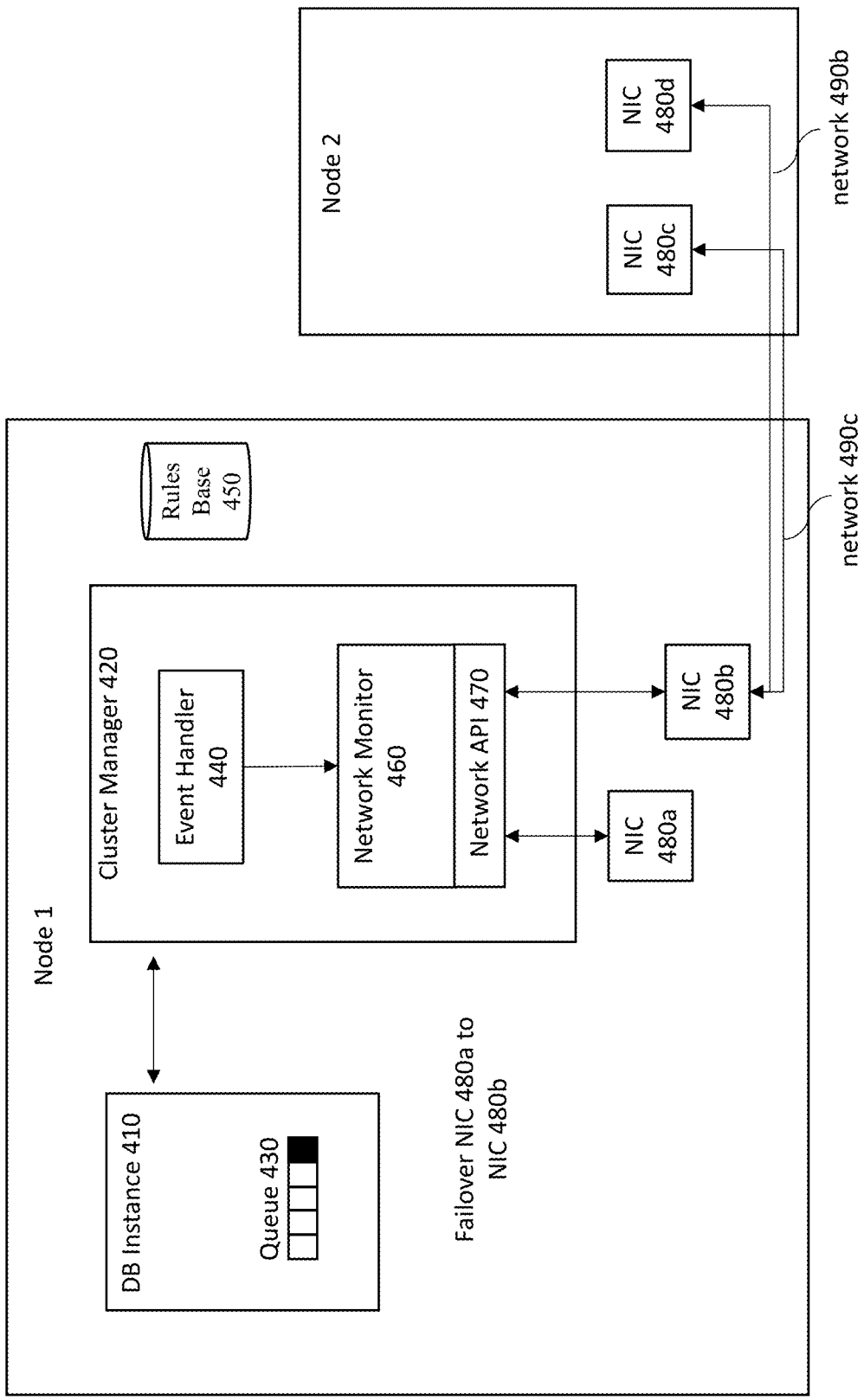

FIG. 7B illustrates that based on the determination that both NIC 480a and NIC 480b are OK, the network monitor 460 may still issue API calls to NIC 480a to failover to NIC 480b. This is because although the network monitor 460 may show that NIC 480a is operating properly, other issues outside of the NICs being inoperable may play a part in the delay of processing. For instance, in some embodiments, although the NIC 480a is operating properly, the processing of the events via NIC 480a may be saturated or the network may be temporarily congested such there may be a delay for messages to be sent to NIC 480a by the DLM. In these situations, the network monitor 460 may simply implement a failover from NIC 480a to NIC 480b to determine if NIC 480b may be able to handle the processing of the message 433 via network 490c.

Figure 7C:
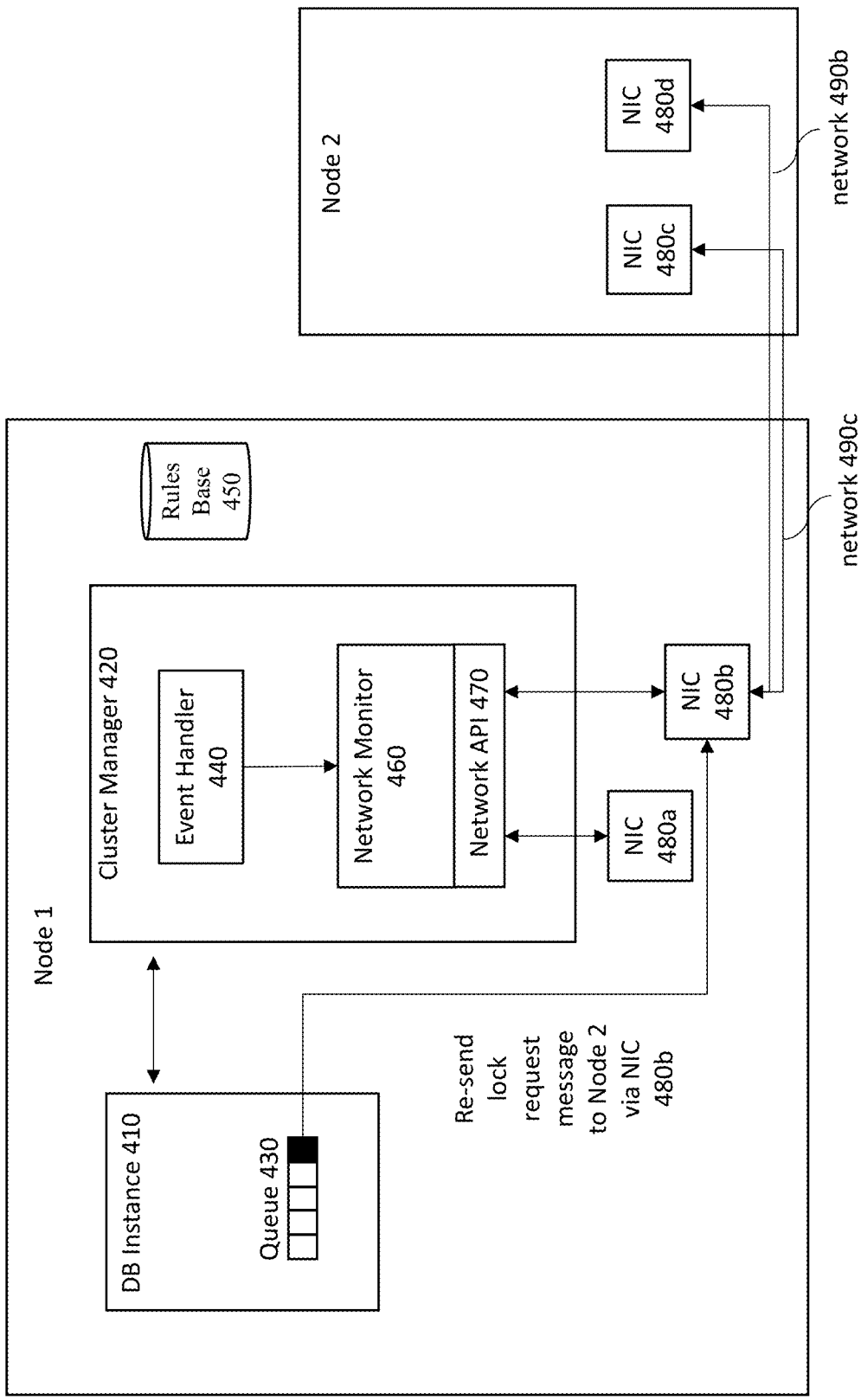
Figure 7D:
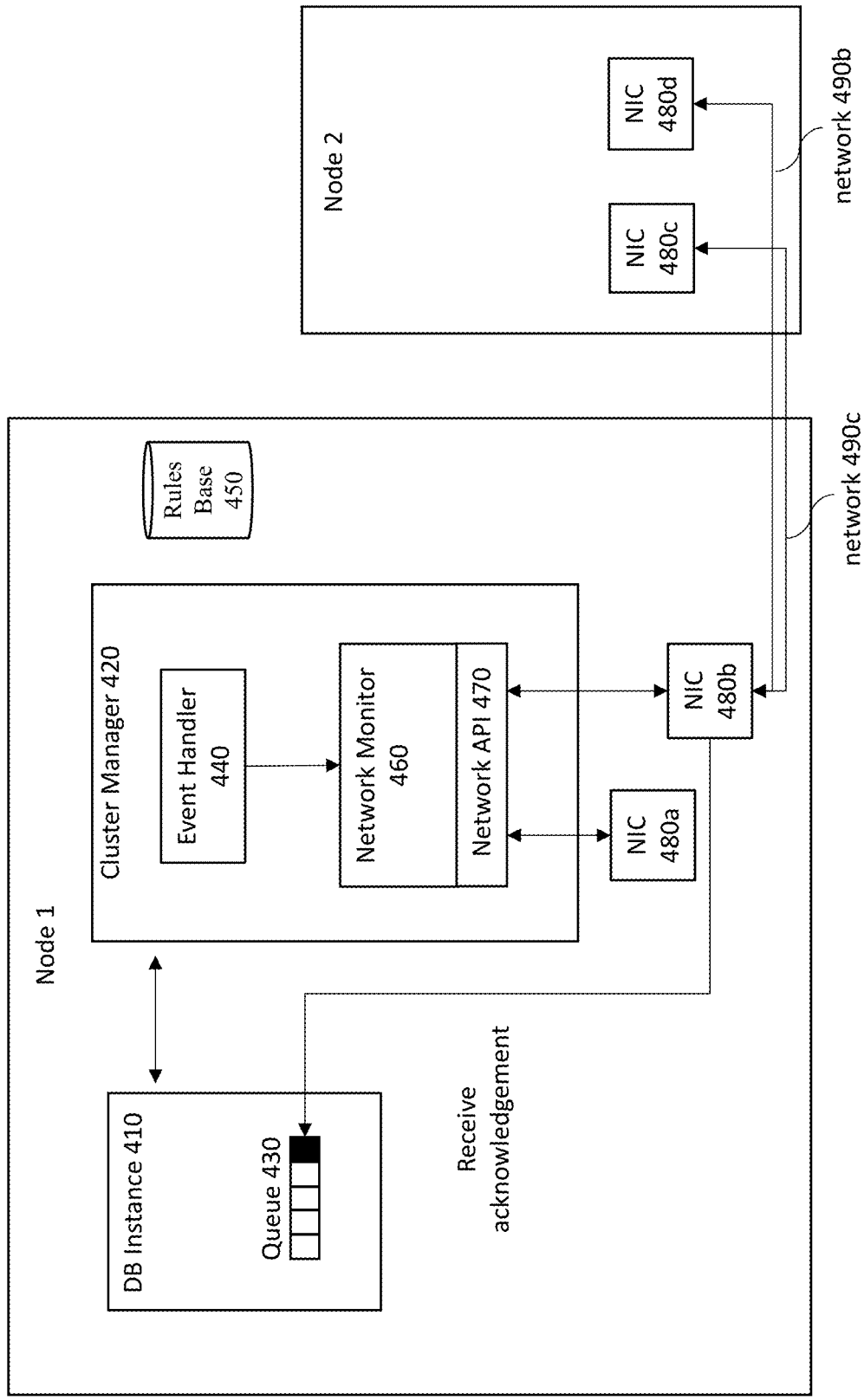
Figure 7E:
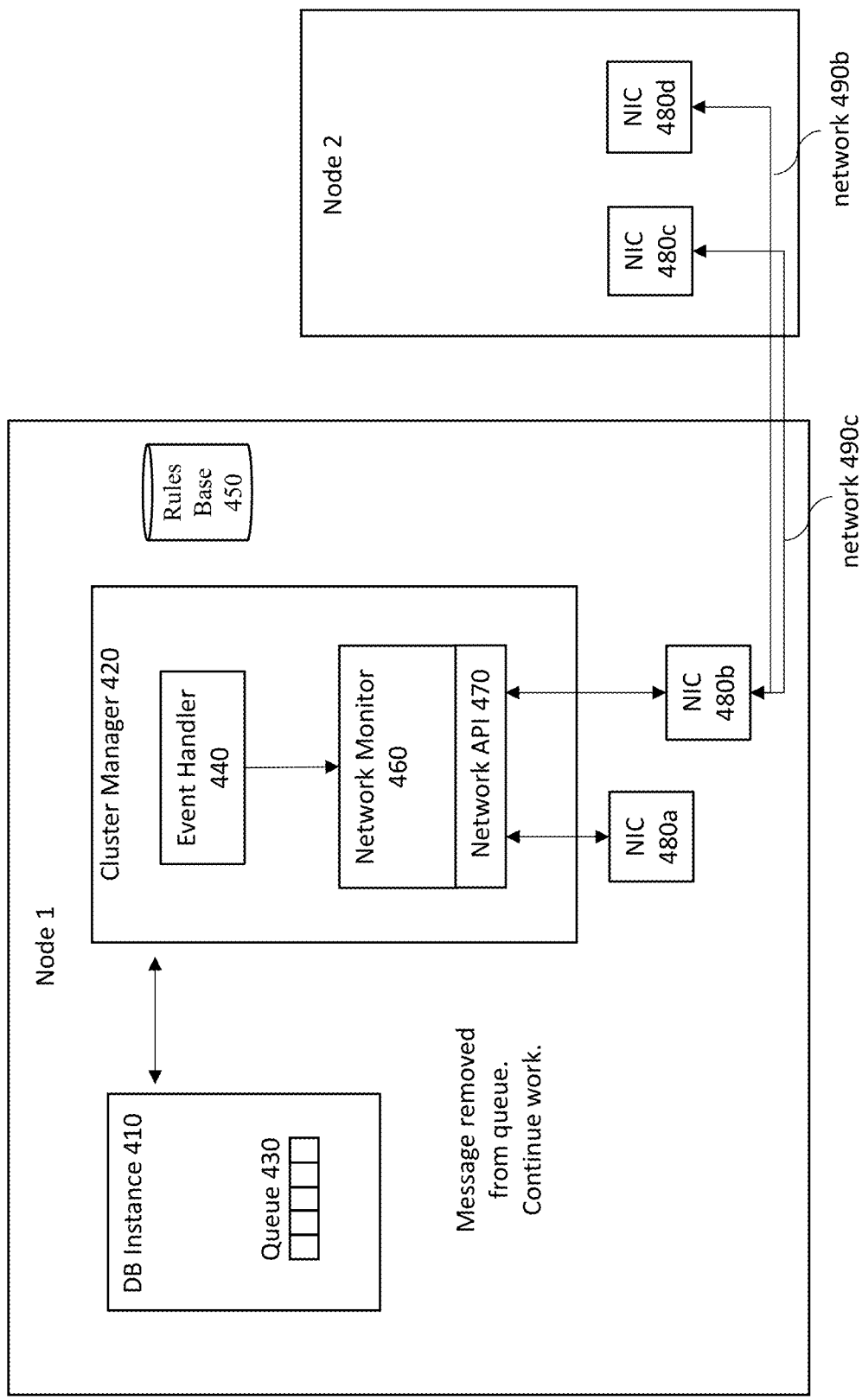

FIG. 7C illustrates that after implementing the failover (e.g., by reconfiguring the private network from node 1 to node 2 from NIC 480a to NIC 480b), the lock request message 433 is resubmitted to node 2 via NIC 480b. FIG. 7D illustrates a successful acknowledgement associated with the message 433 (e.g., normal lock manager processing is completed) is received from node 2. As a result, FIG. 7E illustrates that the message 433 is removed from message queue 430 and processing continues on the database instance 410.

In some embodiments, not depicted in the figures, NIC 480b may not process the message 433 within a predefined time period after the failover (e.g., a second early detection time). In these embodiments, the network monitor 460 may implement a failback process to reconfigure the private network communication between node 1 and node 2 to be the originally configured NIC 480a and NIC 480c. If processing of message 433 is not successful as well and the timeout period threshold eventually is met, then the automatic node eviction process may commence as the last resort option, as opposed to the draconian default option provided in the conventional approach where a node eviction is the default option after the expiration of the timeout period threshold.

What has been disclosed is an approach for maintaining high availability database instances in a database cluster by providing an early detection and remediation of communication issues between nodes of a database cluster. This approach therefore enhances efficiencies of the database cluster by avoiding the draconian approach of automatically evicting nodes from the database cluster simply for certain database transaction processing that exceeds an arbitrarily determined timeout period threshold. This approach greatly improves the processing of the computer system itself by reducing the amount of computer system processing involved in implementing a node eviction when other, more simple solutions, may eliminate the need to perform the costly (e.g., in terms of computer processing) eviction process. This approach greatly improves the technical area of high availability databases by reducing the amount of brownouts experienced in a high availability database system.

System Architecture Overview

Figure 8:
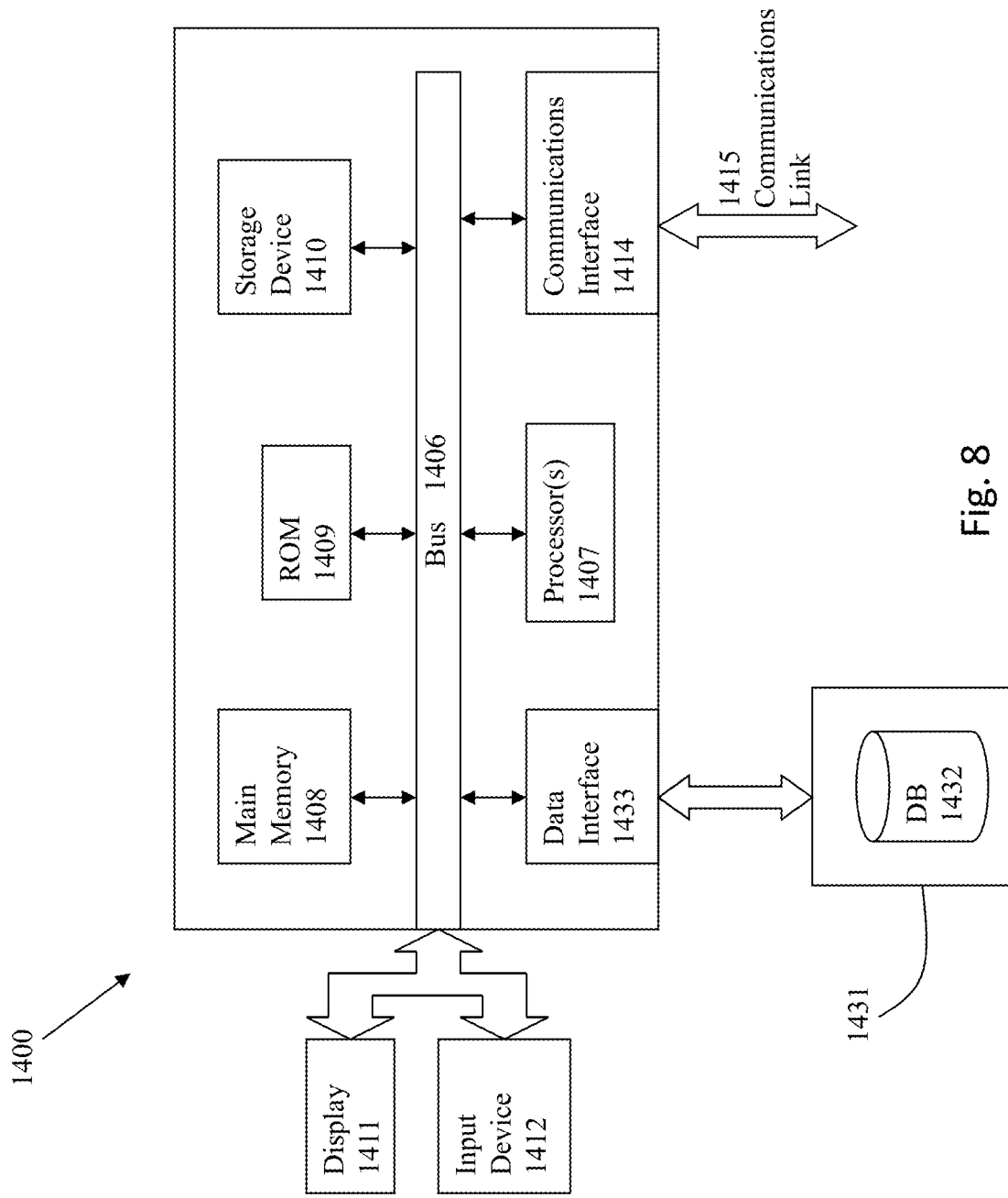
FIG. 8 is a block diagram of an illustrative computing system suitable for implementing an embodiment of the present disclosure.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 9:
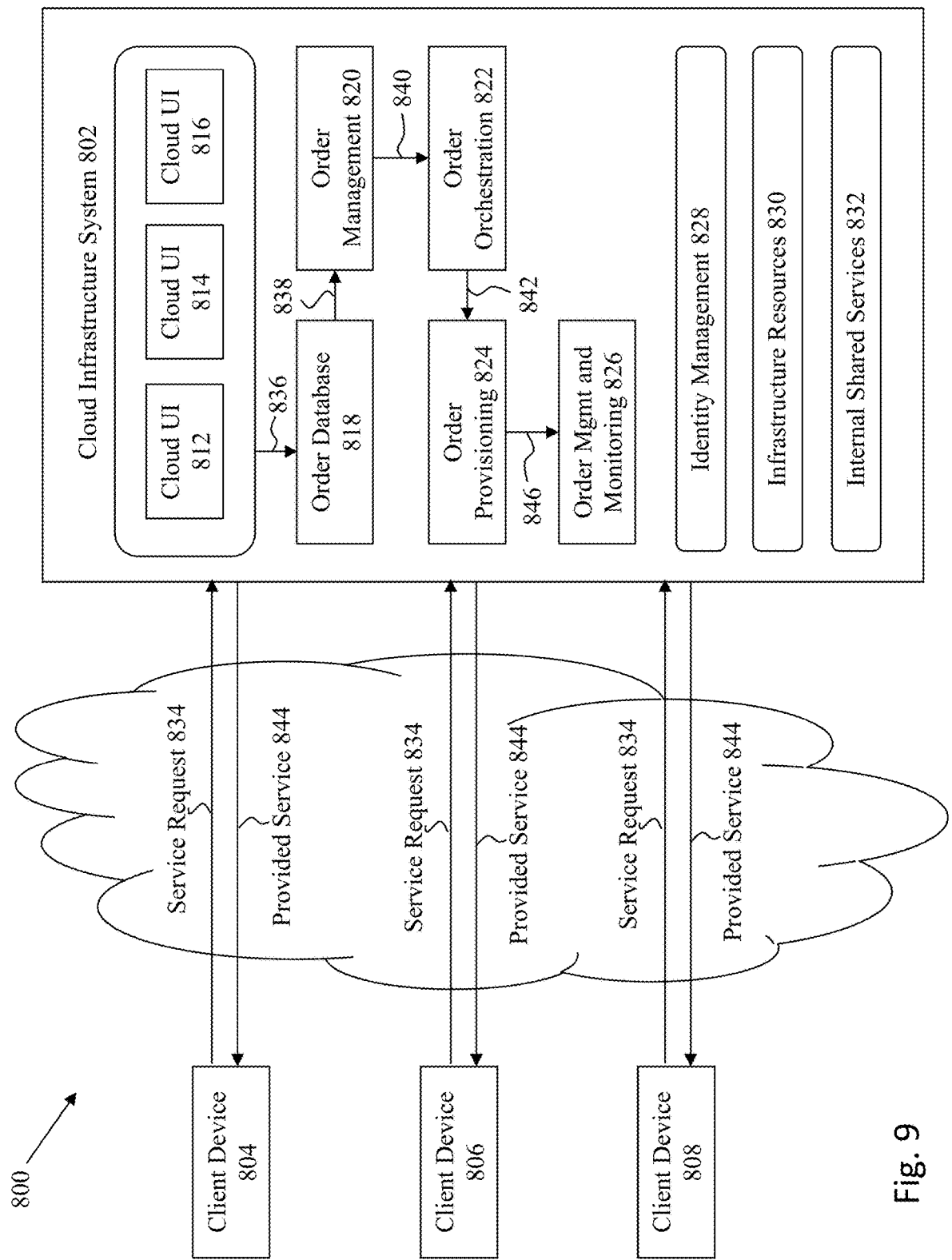
FIG. 9 is a block diagram of one or more components of a system environment by which services provided by one or more components of an embodiment system may be offered as cloud services, in accordance with an embodiment of the present disclosure.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 8. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method for maintaining database instances, the method comprising:
   sending, by a first node within a database cluster system, to a second node within the database cluster system, a database request for a resource stored in the database cluster system, the first node and second node each being database instance nodes configured to provide access to a single shared database, and the database request is a lock request which ensures compatibility of access rights to database resources within the shared database;
   after failing to receive an acknowledgement of the database request within a predetermined time period which is an early detection time that is less than a timeout period threshold, sending an event having an event type, a source internet protocol address (IP), a target IP, and a start time to an event handler;
   retrieving, by the event handler, one or more rules from a rules database for providing instructions to handle the event based at least in part on the event type;

performing network component checks to identify network component statuses and options for responding to the event; and automatically reconfiguring network components based at least in part on the network component statuses identified; and initiating an eviction process to evict a failed node from the database cluster once the event remains unresolved after the timeout period threshold.

2. The method of claim 1, wherein automatically reconfiguring network components comprises:

identifying a first network interface card (NIC) on the first node and a second NIC on the second node, wherein the first NIC on the first node is associated with the source IP and the second NIC on the second node is associated with the target IP, the first NIC and the second NIC providing a first private network communication channel between the first node and the second node;

removing an association of the first NIC from the source IP; and configuring a third NIC on the first node to associate the source IP with the third NIC, wherein the third NIC and the second NIC provide a second private network communication channel between the first node and the second node.

3. The method of claim 1, wherein the steps of performing network component checks and automatically reconfiguring network components are performed by a network handler, and the network handler comprises a network monitor and one or more networkapplication programming interfaces (APIs), the one or more network APIs are operatively coupled to one or more network interface cards (NICs) on the first node.

4. The method of claim 3, wherein the one or more NICs are communicatively coupled to one or more other NICs on the second node, wherein a private network is established between each connection from the one or more NICs on the first node with the one or more other NICs on the second node.

5. A system for maintaining high availability database instances, the system comprising:

a processor;

a memory for holding programmable code; and wherein the programmable code includes instructions for maintaining database instances by:

sending, by a first node within a database cluster system, to a second node within the database cluster system, a database request for a resource stored in the database cluster system, wherein the first node and second node each being database instance nodes configured to provide access to a single shared database, and the database request is a lock request which ensures compatibility of access rights to database resources within the shared database;

after failing to receive an acknowledgement of the database request within a predetermined time period which is an early detection time that is less than a timeout period threshold, sending an event having an event type, a source internet protocol address (IP), a target IP, and a start time, to an event handler, retrieving, by the event handler, one or more rules from a rules database for providing instructions to handle the event based at least in part on the event type, performing network component checks to identify network component statuses and options for responding to the event, automatically reconfiguring network components based at least in part on the network component statuses identified and initiating an eviction process to evict a failed node from the database cluster once the event remains unresolved after the timeout period threshold.

6. The system of claim 5, wherein automatically reconfiguring network components comprises:

identifying a first network interface card ("NIC") on the first node and a second NIC on the second node, wherein the first NIC on the first node is associated with the source IP and the second NIC on the second node is associated with the target IP, the first NIC and the second NIC providing a first private network communication channel between the first node and the second node;

removing an association of the first NIC from the source IP; and configuring a third NIC on the first node to associate the source IP with the third NIC, wherein the third NIC and the second NIC provide a second private network communication channel between the first node and the second node.

7. The system of claim 5, wherein the steps of performing network component checks and automatically reconfiguring network components are performed by a network handler, and the network handler comprises a network monitor and one or more networkapplication programming interfaces (APIs), the one or more network API is operatively coupled to one or more network interface cards (NICs) on the first node.

8. The system of claim 7, wherein the one or more NICs are communicatively coupled to one or more other NICs on the second node, wherein a private network is established between each connection from the one or more NICs on the first node with the one or more other NICs on the second node.

9. A computer program product embodied on a non-transitory computer readable medium, the computer readable medium having stored thereon a sequence ofinstructions which, when executed by a processor causes the processor to execute a method for maintaining high availability database instances, the method comprising:

sending, by a first node within a database cluster system, to a second node within the database cluster system, a database request for a resource stored in the database cluster system, the first node and second node each being database instance nodes configured to provide access to a single shared database, and the database request is a lock request which ensures compatibility of access rights to database resources within the shared database;

after failing to receive an acknowledgement of the database request within a predetermined time period which is an early detection time that is less than a timeout period threshold, sending an event having an event type, a source internet protocol address (IP), a target IP, and a start time to an event handler;

retrieving, by the event handler, one or more rules from a rules database for providing instructions to handle the event based at least in part on the event type;

performing network component checks to identify network component statuses and options for responding to the event;

automatically reconfiguring network components based at least in part on the networkcomponent statuses identified; and initiating an eviction process to evict a failed node from the database cluster once the event remains unresolved after the timeout period threshold.

10. The computer program product of claim 9, wherein automatically reconfiguring network components comprises:
   identifying a first network interface card ("NIC") on the first node and a second NIC on the second node, wherein the first NIC on the first node is associated with the source IP and the second NIC on the second node is associated with the target IP, the first NIC and the second NIC providing a first private network communication channel between the first node and the second node;
   removing an association of the first NIC from the source IP; and
   configuring a third NIC on the first node to associate the source IP with the third NIC, wherein the third NIC and the second NIC provide a second private network communication channel between the first node and the second node.

11. The computer program product of claim 9, wherein steps of performing network component checks and automatically reconfiguring network components are performed by a network handler, and the network handler comprises a network monitor and one or more network application programming interfaces (APIs), the one or more network API is operatively coupled to one or more network interface cards (NICs) on the first node.

12. The computer program product of claim 11, wherein the one or more NICs arecommunicatively coupled to one or more other NICs on the second node, wherein a private network is established between each connection from the one or more NICs on the first node with the one or more other NICs on the second node.

13. A computer implemented method for maintaining database instances, the methodcomprising:
   sending, by a first node within a database cluster system, to a second node within the database cluster system, a database request for a resource stored in the database cluster system, the first node and second node each being database instance nodes configured to provide access to a single shared database, and the database request is a lock request which ensures compatibility of access rights to database resources within the shared database;
   after failing to receive an acknowledgement of the database request within a predetermined time period, sending an event having an event type, a source internet protocol address (IP), a target IP, and a start time, to an event handler;
   retrieving, by the event handler, one or more rules from a rules database for providing instructions to handle the event based at least in part on the event type;
   performing network component checks to identify network component statuses and options for responding to the event; and
   automatically reconfiguring network components based at least in part on the network component statuses identified, automatically reconfiguring network componentscomprising:
      identifying a first network interface card (NIC) on the first node and a second NIC on the second node, wherein the first NIC on the firstnode is associated with the source IP and the second NIC on the second node is associated with the target IP, the first NIC and thesecond NIC providing a first private network communication channel between the first node and the second node;
      removing an association of the first NIC from the source IP; and configuring a third NIC on the first node to associate the source IP with the third NIC, wherein the third NIC and the second NIC provide asecond private network communication channel between the first node and the second node.

14. The method of claim 13, wherein the predetermined time period is an early detection time that is less than a timeout period threshold.

15. The method of claim 14, further comprising initiating an eviction process to evict a failed node from the database cluster once the event remains unresolved after the timeout period threshold.

16. The method of claim 13, wherein the steps of performing network component checks and automatically reconfiguring network components are performed by a network handler, and the network handler comprises a network monitor and one or more network application programming interfaces (APIs), the one or more network APIs are operatively coupled to one or more network interface cards (NICs) on the first node.

17. The method of claim 16, wherein the one or more NICs are communicatively coupled to one or more other NICs on the second node, wherein a private network is established between each connection from the one or more NICs on the first node with the one or more other NICs on the second node.

* * * * *

UNITED STATES PATENT AND TRADEMARK OFFICE
CERTIFICATE OF CORRECTION

| | |
|---|---|
| PATENT NO. | : 11,354,299 B2 |
| APPLICATION NO. | : 16/165997 |
| DATED | : June 7, 2022 |
| INVENTOR(S) | : Zhu et al. |

It is certified that error appears in the above-identified patent and that said Letters Patent is hereby corrected as shown below:

In the Drawings

On sheet 7 of 27, in FIG. 4D, Line 9, delete "Acknowledgment" and insert -- Acknowledgement --, therefor.

On sheet 8 of 27, in FIG. 4E, Line 9, delete "Acknowledgment" and insert -- Acknowledgement --, therefor.

In the Specification

In Column 3, Line 46, delete "work is the." and insert -- work. --, therefor.

In Column 19, Line 13, delete "cloudservices" and insert -- cloud services --, therefor.

In Column 20, Line 18, delete "cloudservices" and insert -- cloud services --, therefor.

In the Claims

In Column 23, Line 29, in Claim 3, delete "networkapplication" and insert -- network application --, therefor.

In Column 24, Line 27, in Claim 7, delete "networkapplication" and insert -- network application --, therefor.

In Column 24, Lines 40-41, in Claim 9, delete "ofinstructions" and insert -- of instructions --, therefor.

In Column 24, Line 66, in Claim 9, delete "networkcomponent" and insert -- network component --, therefor.

In Column 25, Line 19, in Claim 10, delete "NIC,wherein" and insert -- NIC, wherein --, therefor.

Signed and Sealed this
Tenth Day of January, 2023

Katherine Kelly Vidal
*Director of the United States Patent and Trademark Office*

In Column 25, Line 32, in Claim 12, delete "arecommunicatively" and insert -- are communicatively --, therefor.

In Column 25, Line 38, in Claim 13, delete "methodcomprising:" and insert -- method comprising: --, therefor.

In Column 26, Lines 12-13, in Claim 13, delete "componentscomprising:" and insert -- components comprising: --, therefor.

In Column 26, Line 15, in Claim 13, delete "firstnode" and insert -- first node --, therefor.

In Column 26, Line 18, in Claim 13, delete "thesecond" and insert -- the second --, therefor.

In Column 26, Line 25, in Claim 13, delete "asecond" and insert -- a second --, therefor.